US006147946A

United States Patent [19]

Yamada et al.

[11] Patent Number: 6,147,946

[45] **Date of Patent: *Nov. 14, 2000**

[54] OPTICAL DISK APPARATUS

[75] Inventors: Shin-Ichi Yamada, Oosakafu; Mitsurou Moriya, Naraken; Yasuaki Edahiro, Osakafu; Kouichi Takamine, Oosakafu; Katsuya Watanabe, Osakafu, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/001,289

[22] Filed: Dec. 31, 1997

Related U.S. Application Data

[62] Division of application No. 08/687,028, Jul. 25, 1996.

[30] Foreign Application Priority Data

| | | | |
|---|---|---|---|
| Jul. 27, 1995 | [JP] | Japan | 7-191681 |
| Mar. 18, 1996 | [JP] | Japan | 8-060512 |

[51] Int. Cl.[7] .......... G11B 7/00

[52] U.S. Cl. .......... 369/58; 369/44.25; 369/44.27

[58] Field of Search .......... 369/94, 58, 112, 369/32, 44.25, 44.41

[56] References Cited

U.S. PATENT DOCUMENTS

| | | | |
|---|---|---|---|
| 4,850,695 | 7/1989 | Mikuriya et al. | 369/53 |
| 5,003,521 | 3/1991 | Yoshida et al. | 369/44.25 |
| 5,105,418 | 4/1992 | Kenmotsu et al. | 369/199 |
| 5,235,581 | 8/1993 | Miyagawa et al. | 369/58 |
| 5,255,262 | 10/1993 | Best et al. | 369/94 |
| 5,373,499 | 12/1994 | Imaino et al. | 369/275.2 |
| 5,379,282 | 1/1995 | Wachi | 369/44.25 |
| 5,381,392 | 1/1995 | Hira | 369/58 |
| 5,446,565 | 8/1995 | Komma et al. | 369/94 |
| 5,541,900 | 7/1996 | Ito et al. | 369/54 |
| 5,592,447 | 1/1997 | Takishima | 369/54 |
| 5,621,717 | 4/1997 | Finkelstein et al. | 369/112 |
| 5,671,202 | 9/1997 | Brownstein et al. | 369/58 |
| 5,671,203 | 9/1997 | Ra | 369/44.27 |
| 5,677,903 | 10/1997 | Holtslag et al. | 369/94 |
| 5,684,771 | 11/1997 | Furukawa et al. | 369/58 |
| 5,684,773 | 11/1997 | Hayashi | 369/48 |
| 5,701,288 | 12/1997 | Seong | 369/58 |
| 5,708,638 | 1/1998 | Braat et al. | 369/58 |
| 5,710,749 | 1/1998 | Tsukai et al. | 369/58 |
| 5,724,325 | 3/1998 | Jeong | 369/58 |
| 5,745,460 | 4/1998 | Tateishi | 369/58 |
| 5,745,461 | 4/1998 | Kawasaki | 369/58 |
| 5,751,675 | 5/1998 | Tsuksui et al. | 369/44.27 |
| 5,790,493 | 8/1998 | Takeya et al. | 369/58 |

FOREIGN PATENT DOCUMENTS

| | | | |
|---|---|---|---|
| 6333255 | 12/1994 | Japan | 369/112 |
| 7-296498 | 11/1995 | Japan . | |
| 89-700255 | 3/1989 | Rep. of Korea . | |

*Primary Examiner*—Nabil Hindi
*Attorney, Agent, or Firm*—Wenderoth, Lind & Ponack, L.L.P.

[57] ABSTRACT

An optical disk apparatus comprising means for moving a focal point of a light beam for reproducing information recorded on an information face of a disk, in the direction perpendicular to the information face; means for detecting a reflected light from the disk; and means for discriminating whether the disk set in the apparatus is a disk having a thick base substrate or a disk having a thin base substrate. In this apparatus, a maximum value $AS1L_{max}$ of an output signal from the reflected light detecting means and a maximum value $ENV_{max}$ of an amplitude of an information reproducing signal are detected while driving the focal point moving means so that the focal point passes through the information face, and the discriminating means discriminates whether the disk set in the apparatus is a disk having a thick base substrate or a disk having a thin base substrate, on the basis of the ratio of $ENV_{max}$ to $AS1L_{max}$. Therefore, it is possible to discriminate between a DVD having a thin base substrate and a CD having a thick base substrate.

6 Claims, 25 Drawing Sheets single-layer DVD
FE
ENV
t12
double-layer DVD
FE
ENV
t13
CD
FE
ENV
t10
t11
change due to $F_{CD}$
change due to $F_{DVD}$
away from disk (move downward)
toward disk (move upward)

Fig.2 (a)
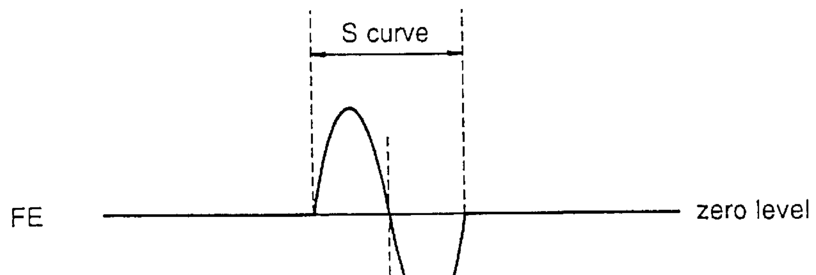
Fig.2 (b)
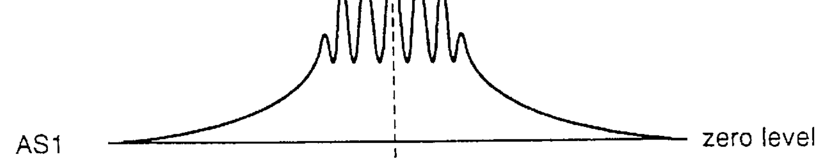
Fig.2 (c)
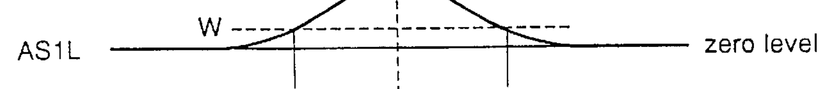
Fig.2 (d)
Fig.2 (e)
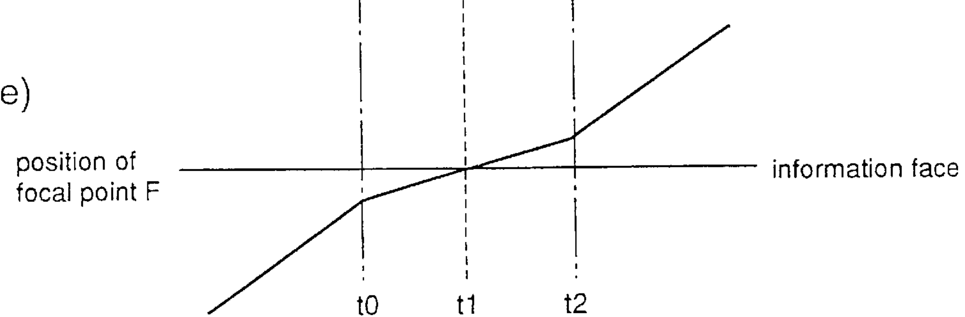

100
102
110
127
105
106
108
126
149
motor
101
motor
118
transport motor
103
107
113
116
111
150
109
112
104
114
115
119
I/V converter
I/V converter
I/V converter
I/V converter
120
121
124
122
123
117
130
131
148
125
TE
FE
AS1
phase compensator
132
133
power amplifier
134
135
136
phase compensator
power amplifier
701
HPF
comparator
counter
D/A
141
700
702
OK
power amplifier
D/A
145
747
a
micro-computer
139
laser driving circuit
D/A
146
b
129 transport motor
motor
motor
I/V converter
I/V converter
I/V converter
I/V converter
I/V converter
AS2
AS1
TE
FE
AS2L
AS
ASL
AS1L
ENV
FODA
OK
LPF
LPF
LPF
A/D
A/D
A/D
A/D
A/D
D/A
D/A
D/A
D/A
phase compensator
phase compensator
power amplifier
power amplifier
power amplifier
envelope detector
laser driving circuit
micro-computer
a single-layer DVD
FE
ENV
AS1L
ASL
ENV/ASL
ENVp
AS1Lp
ASLmax =ASLp
t31 double-layer DVD
FE
ENV
AS1L
ASL
ENV/ASL
ENVp
AS1Lp
ASLmax =ASLp
t32
t33

CD
FE
ENV
AS1L
ASL
ENV/ASL
ENVp
AS1Lp
ASLp
ASLmax
t30
change due to FCD
change due to FDVD
away from disk (move downward)
toward disk (move upward)

100
102
170
149
105
106
motor
101
motor
118
108
171
172
transport motor
107
113
150
109
103
116
111
114
115
119
I/V converter
I/V converter
I/V converter
I/V converter
120
104
121
124
122
123
117
130
131
148
125
TE
FE
phase compensator
132
133
power amplifier
AS1
134
135
136
phase compensator
power amplifier
500
CD/DVD
signal processing circuit
D/A
141
547
OK
power amplifier
D/A
a
145
139
micro-computer
laser driving circuit
D/A
146
129

OPTICAL DISK APPARATUS

This application is a division of Ser. No. 08/687,028 filed Jul. 25, 1996.

FIELD OF THE INVENTION

The present invention relates to an optical disk apparatus that reproduces different kinds of disks, such as a compact disk and a digital video disk.

BACKGROUND OF THE INVENTION

There is an optical disk apparatus in which a light beam emitted from a laser is focused on a rotating disk to reproduce signals recorded in the disk.

FIG. 25 is an enlarged view of a part of a typical compact disk (hereinafter referred to as CD). In the figure, reference numeral 1 designates a base substrate of the CD, numeral 2 designates an information surface, and numeral 3 designates a series of pits on the information surface. These pits 3 provide a spiral track. The pitch of the spiral track is 1.6 $\mu$m. Aluminum is vapor-deposited on the information surface 2 as a reflecting film. The rear surface of the disk, opposite the information surface 2, is irradiated with a light beam. When information recorded on the track is reproduced, focusing is performed so that a focal point of the light beam is always positioned on the information surface 2 where the Al reflecting film is present, and tracking is performed so that the focal point of the light beam is positioned on the track. The diameter of the disk is about 120 mm, and the thickness of the base substrate 1 is 1.2 mm. The wavelength of the light beam is 780 nm.

In recent years, disks with high recording density, for example, a digital video disk (hereinafter referred to as DVD) in which digital image data are recorded, have been proposed. Hereinafter, a DVD will be described as an example of a high recording density disk. However, the present invention is not restricted to a DVD.

The recording density of the DVD is about five times as high as that of the CD. In order to achieve this recording density, the track pitch is reduced to 0.74 $\mu$m and the track recording density (number of data on the track per a unit length) is increased. With the increase in the recording density, the wavelength of the light beam is reduced to 650 nm. In order to reliably reproduce information recorded in the disk even when the disk is inclined, the thickness of a base substrate of the disk is 0.6 mm, that is, thinner than that of the CD. The diameter of the DVD is approximately equal to that of the CD. Hereinafter, this DVD is called a single-layer DVD.

Besides the single-layer DVD mentioned above, there is also a double-layer DVD as shown in FIG. 26. In FIG. 26, reference numeral 4 designates a first layer, numeral 5 designates a second layer, numeral 6 designates an intermediate layer, and numeral 10 designates a base substrate of the DVD. The DVD is irradiated with a light beam at the rear surface of the base substrate 10. Like the single-layer DVD, the first layer 4 wherein information is recorded is 0.6 mm distant from the rear surface of the base substrate 10. A reflecting film comprising Au or the like is employed as the first layer 4, and the reflectivity is reduced to about 35%. So, a part of the light beam passes through the first layer 4. This first layer serves as a first information surface. The second layer 5 is located on the first layer 4 with the 40 $\mu$m thick intermediate layer 6 between them. The light beam passing through the first layer 4 is reflected by the second layer 5 and travels through the intermediate layer 6, the first layer 4, and the base substrate 10. This second layer serves as a second information surface. Thereby, information recorded in the first layer 4 and the second layer 5 can be reproduced. The second layer 5 comprises aluminum or the like, and the reflectivity is about 90%. The recording capacity of this double-layer DVD is about twice as large as that of the single-layer DVD. In this double-layer DVD, when information recorded in the first information surface 4 is reproduced, focusing is performed on the first information surface 4. When information recorded in the second information surface 5 is reproduced, after the focal point is moved from the first information surface 4 to the second information surface 5, focusing is performed on the second information surface 5.

When a CD and a DVD are reproduced using an optical disk apparatus, the apparatus is provided with an optical system for reproducing the CD and an optical system for reproducing the DVD because the CD and the DVD have different base material thicknesses, and the optical systems are switched according to a disk set in the apparatus. In order to identify whether the disk set in the apparatus is a CD or a DVD, a cartridge containing the disk has a hole for discrimination.

However, when the disk is not contained in a cartridge, it is impossible to identify the disk using a cartridge. If the optical system for the DVD is used for the CD, information is not correctly reproduced because of the difference in base material thicknesses between the CD and the DVD.

Meanwhile, there is a disk called CD-R which is a recordable optical disk of write once read many type. When the CD-R, which employs the same optical system for the CD, is set in the optical disk apparatus, if the optical system for the DVD is selected by mistake, information recorded in the CD-R is sometimes destroyed. This destruction is attributed to the fact that the CD-R usually employs, for a recording film, an organic coloring material that highly absorbs light having a wavelength of 650 nm and, therefore, the recording film is easily destroyed.

SUMMARY OF THE INVENTION

An object of the present invention is to provide an optical disk apparatus that can discriminate between a CD and a DVD even when these disks are not contained in cartridges.

Another object of the present invention is to provide an optical disk apparatus that can discriminate between a CD-R and a DVD without destroying an information surface of the CD-R when the CD-R is set in the apparatus by mistake.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an optical disk apparatus comprising means for moving a focal point of a light beam for reproducing information recorded on an information face of a disk, in the direction perpendicular to the information face; means for detecting a reflected light from the disk; and means for discriminating whether the disk set in the apparatus is a disk having a thick base substrate or a disk having a thin base substrate. In this apparatus, a maximum value $AS1L_{max}$ of an output signal from the reflected light detecting means and a maximum value $ENV_{max}$ of an amplitude of an information reproducing signal are detected while driving the focal point moving means so that the focal point passes through the information face, and the discriminating means discriminates whether the disk set in the apparatus is a disk having a thick base substrate or a disk having a thin base substrate, on the basis of the ratio of $ENV_{max}$ to $AS1L_{max}$. Therefore, it is possible to discriminate between a DVD having a thin base substrate and a CD having a thick base substrate.

According to a second aspect of the present invention, there is provided an optical disk apparatus comprising means for moving a focal point of a light beam for reproducing information recorded on an information face of a disk, in the direction perpendicular to the information face; means for detecting a reflected light from the disk; a signal detecting means for detecting a prescribed frequency component from an output signal from the reflected light detecting means; and means for discriminating whether the disk set in the apparatus is a disk having a high track recording density or a disk having a low track recording density. In this apparatus, the discriminating means discriminates whether the disk set in the apparatus is a disk having a high track recording density or a disk having a low track recording density, on the basis of an output signal from the signal detecting means when the focal point moving means is driven so that the focal point passes through the information face. Therefore, it is possible to discriminate between a disk having a high track recording density and a disk having a low track recording density.

According to a third aspect of the present invention, there is provided an optical disk apparatus comprising means for moving a focal point of a light beam for reproducing information recorded on an information face of a disk, in the direction perpendicular to the information face; means for detecting a reflected light from the disk; means for digitizing an output signal from the reflected light detecting means; means for measuring a high level period or a low level period of time for an output signal from the digitizing means; and means for discriminating whether the disk set in the apparatus is a disk having a high track recording density or a disk having a low track recording density. In this apparatus, the discriminating means discriminates whether the disk set in the apparatus is a disk having a high track recording density or a disk having a low track recording density, on the basis of a signal output from the period measuring means when the focal point moving means is driven so that the focal point passes through the information face. Therefore, it is possible to discriminate between a disk having a high track recording density and a disk having a low track recording density.

According to a fourth aspect of the present invention, there is provided an optical disk apparatus comprising means for moving a focal point of a light beam for reproducing information recorded on an information face of a disk, in the direction perpendicular to the information face; means for detecting a reflected light from the disk; and means for discriminating the disk set in the apparatus as a disk employing an organic coloring material for a recording film when a signal output from the reflected light detecting means when the focal point moving means is driven so that the focal point passes through the information face is lower than a prescribed level. Therefore, it is possible to discriminate a CD-R in a relatively simple structure.

According to a fifth aspect of the present invention, the above-mentioned apparatus further comprises a focus error signal detector detecting a focus error signal that shows a focused state of the light beam irradiating the information face of the disk on the basis of the output signal from the reflected light detecting means, and the discriminating means discriminates the disk set in the apparatus as a disk employing an organic coloring material for a recording film when an amplitude of the focus error signal is lower than a prescribed level. Therefore, it is possible to discriminate a CD-R in a relatively simple structure.

According to a sixth aspect of the present invention, in the above-mentioned apparatus, the discrimination of the disk employing an organic coloring material is performed with a light beam having an intensity lower than the intensity of the light beam for reproducing the information. Therefore, even when the disk set in the apparatus is a CD-R, information recorded in the CD-R is not destroyed when the disk is discriminated.

According to a seventh aspect of the present invention, there is provided an optical disk apparatus comprising means for moving a focal point of a light beam for reproducing information recorded on an information face of a disk, in the direction perpendicular to the information face; means for detecting a reflected light from the disk; and means for discriminating whether the disk set in the apparatus is a disk having one information face or a disk having two information faces. In this apparatus, the discriminating means discriminates the disk set in the apparatus as a disk having two information faces when a signal output from the reflected light detecting means when the focal point moving means is driven so that the focal point passes through the information face is lower than a prescribed level. Therefore, the discrimination between a single-layer DVD and a double-layer DVD can be performed using the maximum value of the ENV signal, in a relatively simple structure.

According to an eighth aspect of the present invention, the above-mentioned apparatus further comprises a focus error signal detector detecting a focus error signal that shows a focused state of the light beam irradiating the information face of the disk on the basis of an output signal from the reflected light detecting means, and the discriminating means discriminates the disk set in the apparatus as a disk having two information faces when an amplitude of the focus error signal is lower than a prescribed level. Therefore, it is possible to discriminate between a single-layer DVD and a double-layer DVD.

According to a ninth aspect of the present invention, there is provided an optical disk apparatus comprising means for moving a focal point of a light beam for reproducing information recorded on an information face of a disk, in the direction perpendicular to the information face; means for detecting a reflected light from the disk; and means for discriminating whether the disk set in the apparatus is a disk having a thick base substrate or a disk having a thin base substrate, on the basis of an maximum value of an amplitude of an information reproducing signal output from the reflected light detecting means when the focal point moving means is driven so that the focal point passes through the information face. Therefore, the discrimination between a DVD having a thin base substrate and a CD having a thick base substrate can be performed in a relatively simple structure.

According to a tenth aspect of the present invention, in the above-mentioned apparatus, the information recorded in the disk is reproduced using an optical system for a disk having a thin base substrate. Therefore, when a disk having a thin base substrate is set in the apparatus, the time interval before the reproduction of information is reduced.

According to an eleventh aspect of the present invention, in the above-mentioned apparatus, the moving speed of the focal point is reduced by controlling the focal point moving means when the output from the reflected light detecting means exceeds a prescribed level. Therefore, level changes of an AS1L signal, an ENV signal, and an FE signal becomes gentle, and maximum values of amplitudes of these signals are accurately detected, whereby the reliability of the disk discrimination is improved.

According to a twelfth aspect of the present invention, there is provided an optical disk apparatus for reproducing information recorded on an information face of a disk using an optical head having a first focal point for reproducing a disk having a thick base substrate and a second focal point for reproducing a disk having a thin base substrate, the apparatus comprising means for moving the first and second focal points in the direction perpendicular to the information face; means for detecting a reflected light from the disk; a focus error detecting means for detecting a focused state of a light beam irradiating the information face, on the basis of an output signal from the reflected light detecting means; means for controlling focusing so that the focused state of the light beam becomes a desired state, on the basis of an output signal from the focus error detecting means; and means for generating a timing signal for driving the focusing control means on the basis of an output signal from the focus error detecting means. In this apparatus, the focal point moving means is driven so that the focal points go away from the disk, and the focusing control means is operated in response to the timing signal. When no information is reproduced, the focusing control means is immobilized, and the focal point moving means is driven so that the focal points approach the disk, and the focusing control means is operated in response to the timing signal. Therefore, even though the apparatus is not provided with a disk discriminating means, the focusing control can be performed with focal points suitable for the disk having a thick base substrate and the disk having a thin base substrate, respectively. In addition, when a disk having a thin base substrate is set in the apparatus, the rise time of the apparatus can be reduced.

According to a thirteenth aspect of the present invention, there is provided an optical disk apparatus for reproducing information recorded on an information face of a disk using an optical head having a first focal point for reproducing a disk having a thick base substrate and a second focal point for reproducing a disk having a thin base substrate, the apparatus comprising means for moving the first and second focal points in the direction perpendicular to the information face; means for detecting a reflected light from the disk; a focus error detecting means for detecting a focused state of a light beam irradiating the information face, on the basis of an output signal from the reflected light detecting means; means for controlling focusing so that the focused state of the light beam becomes a desired state, on the basis of an output signal from the focus error detecting means; and means for generating a timing signal for driving the focusing control means on the basis of an output signal from the focus error detecting means. In this apparatus, the focal point moving means is driven so that the focal points approach the disk, and the focusing control means is operated in response to the timing signal. When no information is reproduced, the focusing control means is immobilized, and the focal point moving means is driven so that the focal points go away from the disk, and the focusing control means is operated in response to the timing signal. Therefore, even though the apparatus is not provided with a disk discriminating means, focusing control can be performed with focal points suitable for the disk having a thick base substrate and the disk having a thin base substrate, respectively. In addition, when a disk having a thick base substrate is set in the apparatus, the rise time of the apparatus can be reduced.

According to a fourteenth aspect of the present invention, there is provided an optical disk apparatus for reproducing information recorded on an information face of a disk using an optical head having a first focal point for reproducing a disk having a thick base substrate and a second focal point for reproducing a disk having a thin base substrate, this apparatus comprising means for moving the first and second focal points in the direction perpendicular to the information face; means for detecting a reflected light from the disk; a focus error detecting means for detecting a focused state of a light beam irradiating the information face, on the basis of an output signal from the reflected light detecting means; means for controlling focusing so that the focused state of the light beam becomes a desired state, on the basis of an output signal from the focus error detecting means; means for generating a timing signal for driving the focusing control means on the basis of an output signal from the focus error detecting means; and means for discriminating whether the disk set in the apparatus is a disk having a thick base substrate or a disk having a thin base substrate. In this apparatus, when the disk set in the apparatus is discriminated as a disk having a thick base substrate, the focal point moving means is driven so that the focal points approach the disk, and the focusing control means is operated in response to the timing signal. Therefore, when a disk having a thick base substrate is set in the apparatus, the focusing control can be performed with a focal point suitable for the disk, and the rise time of the apparatus can be reduced.

According to a fifteenth aspect of the present invention, there is provided an optical disk apparatus for reproducing information recorded on an information face of a disk using an optical head having a first focal point for reproducing a disk having a thick base substrate and a second focal point for reproducing a disk having a thin base substrate, the apparatus comprising means for moving the first and second focal points in the direction perpendicular to the information face; means for detecting a reflected light from the disk; a focus error detecting means for detecting a focused state of a light beam irradiating the information face, on the basis of an output signal from the reflected light detecting means; means for controlling focusing so that the focused state of the light beam becomes a desired state, on the basis of an output signal from the focus error detecting means; means for generating a timing signal for driving the focusing control means on the basis of an output signal from the focus error detecting means; and means for discriminating whether the disk set in the apparatus is a disk having a thick base substrate or a disk having a thin base substrate. When the disk set in the apparatus is discriminated as a disk having a thin base substrate, the focal point moving means is driven so that the focal points go away from the disk, and the focusing control means is operated in response to the timing signal. Therefore, when a disk having a thin base substrate is set in the apparatus, the focusing control can be performed with a focal point suitable for the disk, and the rise time of the apparatus can be reduced.

According to a sixteenth aspect of the present invention, there is provided an optical disk apparatus for reproducing information recorded on an information face of a disk using an optical head having a first focal point for reproducing a disk having a thick base substrate and a second focal point for reproducing a disk having a thin base substrate, the apparatus comprising means for moving the first and second focal points in the direction perpendicular to the information face; means for detecting a reflected light from the disk; a focus error detecting means for detecting a focused state of a light beam irradiating the information face, on the basis of an output signal from the reflected light detecting means; means for controlling focusing so that the focused state of the light beam becomes a desired state, on the basis of an output signal from the focus error detecting means; means for generating a timing signal for driving the focusing control means on the basis of an output signal from the focus error detecting means; and means for discriminating whether the disk set in the apparatus is a disk having a thick base substrate or a disk having a thin base substrate. When the disk set in the apparatus is discriminated as a disk having a thick base substrate, the focal point moving means is driven so that the focal points approach the disk, and the focusing control means is operated in response to the timing signal. When the disk set in the apparatus is discriminated as a disk having a thin base substrate, the focal point moving means is driven so that the focal points go away from the disk, and the focusing control means is operated in response to the timing signal. Therefore, the focusing control can be performed with focal points suitable for the disk having a thick base substrate and the disk having a thin base substrate, respectively. In addition, the rise time of the apparatus can be reduced in both cases where a disk having a thick base substrate is set and where a disk having a thin base substrate is set.

According to a seventeenth aspect of the present invention, there is provided an optical disk apparatus for reproducing information recorded on an information face of a disk using an optical head having a first focal point for reproducing a disk having a thick base substrate and a second focal point for reproducing a disk having a thin base substrate, the apparatus comprising means for moving the first and second focal points in the direction perpendicular to the information face; means for detecting a reflected light from the disk, having a first light responsive region that receives a center portion of the reflected light and a second light responsive region that receives a peripheral portion of the reflected light; and means for discriminating whether the disk set in the apparatus is a disk having a thick base substrate or a disk having a thin base substrate, on the basis of signals detected by the first and second light responsive regions when the focal point moving means is driven so that the first and second focal points pass through the information face. Therefore, the discrimination between a disk having a thick base substrate and a disk having a thin base substrate can be performed.

According to an eighteenth aspect of the present invention, in the above-mentioned apparatus, the discriminating means detects that a focal point of a light beam suitable for the disk is near the information face, from the level of an information reproducing signal detected by the reflected light detecting means, and then discriminates whether the disk set in the apparatus is a disk having a thick base substrate or a disk having a thin base substrate, on the basis of the signals detected by the first and second light responsive regions. Therefore, the discrimination of the disk set in the apparatus is accurately performed.

According to an nineteenth aspect of the present invention, in the above-mentioned apparatus, the discriminating means detects that a focal point of a light beam suitable for the disk is near the information face, on the basis of the ratio of a low frequency signal level of the output signal from the reflected light detecting means to the information reproducing signal level. Therefore, the discrimination of the disk can be performed accurately even when the reflectivity of the disk varies.

According to a twentieth aspect of the present invention, in the above-mentioned apparatus, the discriminating means comprises means for dividing an amplitude of an information reproducing signal by a low frequency signal level of an output signal from the reflected light detecting means; and means for measuring an amount of light AS1Lp received by the first light responsive region, an amount of light AS2Lp received by the second light responsive region, and an amplitude ENVp of the information reproducing signal when a value obtained by the division attains a maximum value while driving the focal point moving means so that the first and second focal points pass through the information face. The discriminating means discriminates whether the disk set in the apparatus is a disk having a thick base substrate or a disk having a thin base substrate, on the basis of the ratio of AS1Lp×ENVp to AS2Lp. Therefore, the precision in the discrimination of the disk is improved.

According to a twenty-first aspect of the present invention, in the above-mentioned apparatus, the discriminating means comprises means for adding an output signal from the first light responsive region to an output signal from the second light responsive region; means for dividing an amplitude of an information reproducing signal by a low frequency signal level of an output signal from the reflected light detecting means; and means for measuring a maximum value $ASL_{max}$ obtained by the adding means and measuring an amount of light AS1Lp received by the first light responsive region, an amount of light AS2Lp received by the second light responsive region, and an amplitude ENVp of the information reproducing signal when a value obtained by the dividing means attains a maximum value while driving the focal point moving means so that the first and second focal points pass through the information face. The discriminating means discriminates whether the disk set in the apparatus is a disk having a thick base substrate or a disk having a thin base substrate, on the basis of the ratio of AS1Lp×ENVp to AS2Lp×$ASL_{max}$. Therefore, the discrimination of the disk can be performed accurately even when the reflectivity of the disk varies.

According to a twenty-second aspect of the present invention, there is provided an optical disk apparatus for reproducing information recorded on an information face of a disk using an optical head having a first focal point for reproducing a disk having a thick base substrate and a second focal point for reproducing a disk having a thin base substrate, the apparatus comprising means for moving the first and second focal points in the direction perpendicular to the information face; first and second light detecting means for detecting a reflected light from the disk, the second light detecting means receiving a larger portion of the reflected light than the first light detecting means;

and means for discriminating whether the disk set in the apparatus is a disk having a thick base substrate or a disk having a thin base substrate, on the basis of signals detected by the first and second light detecting means when the focal point moving means is driven so that the first and second focal points pass through the information face. Therefore, the discrimination between a disk having a thick base substrate and a disk having a thin base substrate can be performed.

According to a twenty-third aspect of the present invention, in the above-mentioned apparatus, the discriminating means detects that a focal point of a light beam suitable for the disk is near the information face, from the level of information reproducing signals detected by the first and second light detecting means, and then discriminates whether the disk set in the apparatus is a disk having a thick base substrate or a disk having a thin base substrate, on the basis of signals detected by the first and second light receiving means. Therefore, the discrimination of the disk can be performed accurately.

According to a twenty-fourth aspect of the present invention, in the above-mentioned apparatus, the discriminating means detects that a focal point of a light beam suitable for the disk is near the information face, on the basis of the ratio of a low frequency signal level in the output signals from the first and second light detecting means to the information reproducing signal level.

Therefore, the discrimination of the disk can be performed accurately even when the reflectivity of the disk varies.

According to a twenty-fifth aspect of the present invention, in the above-mentioned apparatus, the discriminating means comprises means for dividing an amplitude of an information reproducing signal by a low frequency signal level of output signals from the first and second light detecting means; and means for measuring an amount of light AS1Lp received by the first light detecting means, an amount of light AS2Lp received by the second light detecting means, and an amplitude ENVp of the information reproducing signal when a value obtained by the division attains a maximum value while driving the focal point moving means so that the first and second focal points pass through the information face. The discriminating means discriminates whether the disk set in the apparatus is a disk having a thick base substrate or a disk having a thin base substrate, on the basis of the ratio of AS1Lp×ENVp to AS2Lp. Therefore, the precision in the discrimination of the disk is improved.

According to a twenty-sixth aspect of the present invention, in the above-mentioned apparatus, the discriminating means comprises means for adding an output signal from the first light detecting means to an output signal from the second light detecting means; means for dividing an amplitude of an information reproducing signal by a low frequency signal level of output signals from the first and second light detecting means; and means for measuring a maximum value $ASL_{max}$ obtained by the adding means and measuring an amount of light AS1Lp received by the first light detecting means, an amount of light AS2Lp received by the second light detecting means, and an amplitude ENVp of the information reproducing signal when a value obtained by the dividing means attains a maximum value while driving the focal point moving means so that the first and second focal points pass through the information face. The discriminating means discriminates whether the disk set in the apparatus is a disk having a thick base substrate or a disk having a thin base substrate, on the basis of the ratio of AS1Lp×ENVp to AS2Lp×$ASL_{max}$. Therefore, the discrimination of the disk can be performed accurately even when the reflectivity of the disk varies.

According to a twenty-seventh aspect of the present invention, there is provided an optical disk apparatus for reproducing both a disk having one information face and a disk having two information faces by irradiating the disk with a focused light beam, the apparatus comprising means for moving a focal point of the light beam in the direction perpendicular to the information face; means for detecting a reflected light from the disk, having a first light responsive region that receives a center portion of the reflected light and a second light responsive region that receives a peripheral portion of the reflected light; and means for discriminating whether the disk set in the apparatus is a disk having one information face or a disk having two information disk, on the basis of signals detected by the first and second light responsive regions when the focal point moving means is driven so that the focal point passes through the information face. Therefore, the discrimination between a disk having one information face and a disk having two information disk can be performed.

According to a twenty-eighth aspect of the present invention, in the above-mentioned apparatus, the discriminating means detects that the focal point of the light beam is near the information face, from the level of an information reproducing signal detected by the reflected light detecting means, and then discriminates whether the disk set in the apparatus is a disk having one information face or a disk having two information faces, on the basis of the signals detected by the first and second light responsive regions. Therefore, the discrimination of the disk can be performed accurately.

According to a twenty-ninth aspect of the present invention, in the above-mentioned apparatus, the discriminating means detects that the focal point of the light beam is near the information face, on the basis of the ratio of a low frequency signal level of the output signal from the reflected light detecting means to the information reproducing signal level. Therefore, the discrimination of the disk can be performed accurately even when the reflectivity of the disk varies.

According to a thirtieth aspect of the present invention, in the above-mentioned apparatus, the discriminating means comprises means for dividing an amplitude of an information reproducing signal by a low frequency signal level of an output signal from the reflected light detecting means; and means for measuring an amount of light AS1Lp received by the first light responsive region, an amount of light AS2Lp received by the second light responsive region, and an amplitude ENVp of the information reproducing signal when a value obtained by the division attains a maximum value while driving the focal point moving means so that the focal point passes through the information face. The discriminating means discriminates whether the disk set in the apparatus is a disk having one information face or a disk having two information faces, on the basis of the ratio of AS1Lp×ENVp to AS2Lp. Therefore, the precision in the discrimination of the disk is improved.

According to a thirty-first aspect of the present invention, in the above-mentioned apparatus, the discriminating means comprises means for adding an output signal from the first light responsive region to an output signal from the second light responsive region; means for dividing an amplitude of an information reproducing signal by a low frequency signal level of an output signal from the reflected light detecting means; and means for measuring a maximum value $ASL_{max}$ obtained by the adding means and measuring an amount of light AS1Lp received by the first light responsive region, an amount of light AS2Lp received by the second light responsive region, and an amplitude ENVp of the information reproducing signal when a value obtained by the dividing means attains a maximum value while driving the focal point moving means so that the focal point passes through the information face. The discriminating means discriminates whether the disk set in the apparatus is a disk having one information face or a disk having two information disks, on the basis of the ratio of AS1Lp×ENVp to AS2Lp×$ASL_{max}$. Therefore, the discrimination of the disk can be performed accurately even when the reflectivity of the disk varies.

According to a thirty-second aspect of the present invention, there is provided an optical disk apparatus for reproducing both a disk having one information face and a disk having two information faces by irradiating the disk with a focused light beam, the apparatus comprising means for moving a focal point in the direction perpendicular to the information face; first and second light detecting means for detecting a reflected light from the disk, the second light detecting means receiving a larger portion of the reflected light than the first light detecting means; and means for discriminating whether the disk set in the apparatus is a disk having one information face or a disk having two information faces, on the basis of signals detected by the first and second light detecting means when the focal point moving means is driven so that the focal point passes through the information face. Therefore, the discrimination between a disk having one information face and a disk having two information face can be performed.

According to a thirty-third aspect of the present invention, in the above-mentioned apparatus, the discriminating means detects that the focal point of the light beam is near the information face, from the level of information reproducing signals detected by the first and second light detecting means, and then discriminates whether the disk set in the apparatus is a disk having one information face or a disk having two information faces, on the basis of signals detected by the first and second light receiving means. Therefore, the discrimination of the disk can be performed accurately.

According to a thirty-fourth aspect of the present invention, in the above-mentioned apparatus, the discriminating means detects that the focal point of the light beam is near the information face, on the basis of the ratio of a low frequency signal level in the output signals from the first and second light detecting means to the information reproducing signal level. Therefore, the discrimination of the disk can be performed accurately even when the reflectivity of the disk varies.

According to a thirty-fifth aspect of the present invention, in the above-mentioned apparatus, the discriminating means comprises means for dividing an amplitude of an information reproducing signal by a low frequency signal level of output signals from the first and second light detecting means; and means for measuring an amount of light AS1Lp received by the first light detecting means, an amount of light AS2Lp received by the second light detecting means, and an amplitude ENVp of the information reproducing signal when a value obtained by the division attains a maximum value while driving the focal point moving means so that the focal point passes through the information face. The discriminating means discriminates whether the disk set in the apparatus is a disk having one information face or a disk having two information faces, on the basis of the ratio of AS1Lp×ENVp to AS2Lp. Therefore, the precision in the discrimination of the disk can be improved.

According to a thirty-sixth aspect of the present invention, in the above-mentioned apparatus, the discriminating means comprises means for adding an output signal from the first light detecting means to an output signal from the second light detecting means; means for dividing an amplitude of an information reproducing signal by a low frequency signal level of output signals from the first and second light detecting means; and means for measuring a maximum value $ASL_{max}$ obtained by the adding means and measuring an amount of light AS1Lp received by the first light detecting means, an amount of light AS2Lp received by the second light detecting means, and an amplitude ENVp of the information reproducing signal when a value obtained by the dividing means attains a maximum value while driving the focal point moving means so that the focal point passes through the information face. The discriminating means discriminates whether the disk set in the apparatus is a disk having one information face or a disk having two information faces, on the basis of the ratio of AS1Lp×ENVp to AS2Lp×$ASL_{max}$. Therefore, the discrimination of the disk can be performed accurately even when the reflectivity of the disk varies.

According to a thirty-seventh aspect of the present invention, there is provided an optical disk apparatus for reproducing information recorded on an information face of a disk using an optical head having a first focal point for reproducing a disk having a thick base substrate and a second focal point for reproducing a disk having a thin base substrate, the apparatus comprising means for moving the first and second focal points in the direction perpendicular to the information face; means for detecting a reflected light from the disk; means for discriminating whether the disk set in the apparatus is a disk having a thick base substrate or a disk having a thin base substrate; and an information face detecting means for detecting that a focal point of a light beam suitable for the disk is near the information face, from an output signal of the reflected light detecting means, while driving the focal point moving means so that the first and second focal points pass through the information face. In this apparatus, the discriminating means discriminates whether the disk set in the apparatus is a disk having a thick base substrate or a disk having a thin base substrate, on the basis of the ratio of a maximum value $ASL_{max}$ of a signal output from the reflected light detecting means to a level ASLp of a signal output from the reflected light detecting means when the information face is detected by the information face detecting means, while driving the focal point moving means so that the first and second focal points pass through the information face. Therefore, the discrimination between a disk having a thick base substrate and a disk having a thin base substrate can be performed.

According to a thirty-eighth aspect of the present invention, in the above-mentioned apparatus, the information face detecting means detects that a focal point of a light beam suitable for the disk is near the information face, on the basis of the ratio of a low frequency signal level of an output signal from the reflected light detecting means to an information reproducing signal level of the output signal. Therefore, the discrimination of the disk can be performed accurately even when the reflectivity of the disk varies.

According to a thirty-ninth aspect of the present invention, there is provided an optical disk apparatus for reproducing information recorded on an information face of a disk using an optical head having a first focal point for reproducing a disk having a thick base substrate and a second focal point for reproducing a disk having a thin base substrate, the apparatus comprising means for moving the first and second focal points in the direction perpendicular to the information face; means for detecting a reflected light from the disk; and means for discriminating whether the disk set in the apparatus is a disk having a thick base substrate or a disk having a thin base substrate. In this apparatus, a maximum value $AS1L_{max}$ of an output from the reflected light detecting means and a maximum value $ENV_{max}$ of an amplitude of an information reproducing signal are measured while driving the focal point moving means so that the first and second focal points pass through the information face, and the discriminating means discriminates whether the disk set in the apparatus is a disk having a thick base substrate or a disk having a thin base substrate on the basis of the ratio of $ENV_{max}$ to $AS1L_{max}$. Therefore, the discrimination between a disk having a thick base substrate and a disk having a thin base substrate can be performed.

According to a fortieth aspect of the present invention, there is provided an optical disk apparatus for reproducing information recorded on an information face of a disk using an optical head having a first focal point for reproducing a disk having a thick base substrate and a second focal point for reproducing a disk having a thin base substrate, the apparatus comprising means for moving the first and second focal points in the direction perpendicular to the information face; means for detecting a reflected light from the disk; a focus error detecting means for detecting focused state of a light beam irradiating the information face, on the basis of an output signal from the reflected light detecting means; means for controlling focusing so that the focused state of the light beam becomes a desired state, on the basis of an output signal from the focus error detecting means, the focusing control means including an amplifier having a variable amplification factor and amplifying the output signal from the focus error detecting means; and an information face detecting means for detecting that a focal point of a light beam suitable for the disk is near the information face, from an output signal of the reflected light detecting means. In this apparatus, the amplification factor of the amplifier is set on the basis of an output value from the reflected light detecting means when the information face detecting means outputs an information face detecting signal, while driving the focal point moving means so that the first and second focal points pass through the information face. Therefore, even when the reflectivity of the disk varies, the amplitude of the FE signal is constant, whereby an accurate timing for performing the focusing control is obtained.

According to a forty-first aspect of the present invention, in the above-mentioned apparatus, after setting the amplification factor of the amplifier, the focusing control means is operated by detecting that an output signal from the amplifier reaches a prescribed value. Therefore, it is avoided that the focusing control is performed at a wrong timing due to noise or the like.

According to a forty-second aspect of the present invention, in the above-mentioned apparatus, the information face detecting means detects that a focal point of a light beam suitable for the disk is near the information face, on the basis of the ratio of a low frequency signal level of an output signal from the reflected light detecting means to an information reproducing signal level of the output signal. Therefore, even when the reflectivity of the disk varies, the presence of the suitable focal point in the vicinity of the information face can be detected at an accurate timing.

According to a forty-third aspect of the present invention, in the above-mentioned apparatus, the discrimination of the disk set in the apparatus is performed after the focal point passes through the information face twice. Therefore, the detection of the reflected light is accurately performed, whereby the precision in the discrimination of the disk is improved.

According to a forty-fourth aspect of the present invention, in the above-mentioned apparatus, the focal point is slightly moved in the direction perpendicular to a track on the disk during a period of time when the focal point is passed through the information face by controlling the focusing control means. Therefore, it is avoided that the focal point is always positioned between tracks, whereby the precision in the discrimination of the disk is improved.

According to a forty-fifth aspect of the present invention, in the above-mentioned apparatus, the moving speed of the focal point is reduced by controlling the focal point moving means when an output value from the reflected light detecting means exceeds a prescribed value. Therefore, the change of the reflected light amount becomes gentle, and the signal level is accurately detected, whereby the precision in the discrimination of the disk is improved.

BRIEF DESCRIPTION OF THE DRAWINGS

FIGS. 2(*a*)–2(*d*) are waveforms of an FE signal, an AS1 signal, an AS1L signal, and an ENV signal, respectively, and FIG. 2(*e*) illustrates a position of a focal point F, according to the first embodiment of the invention.

DETAILED DESCRIPTION OF THE PREFERRED EMBODIMENT

[Embodiment 1]

Figure 1:
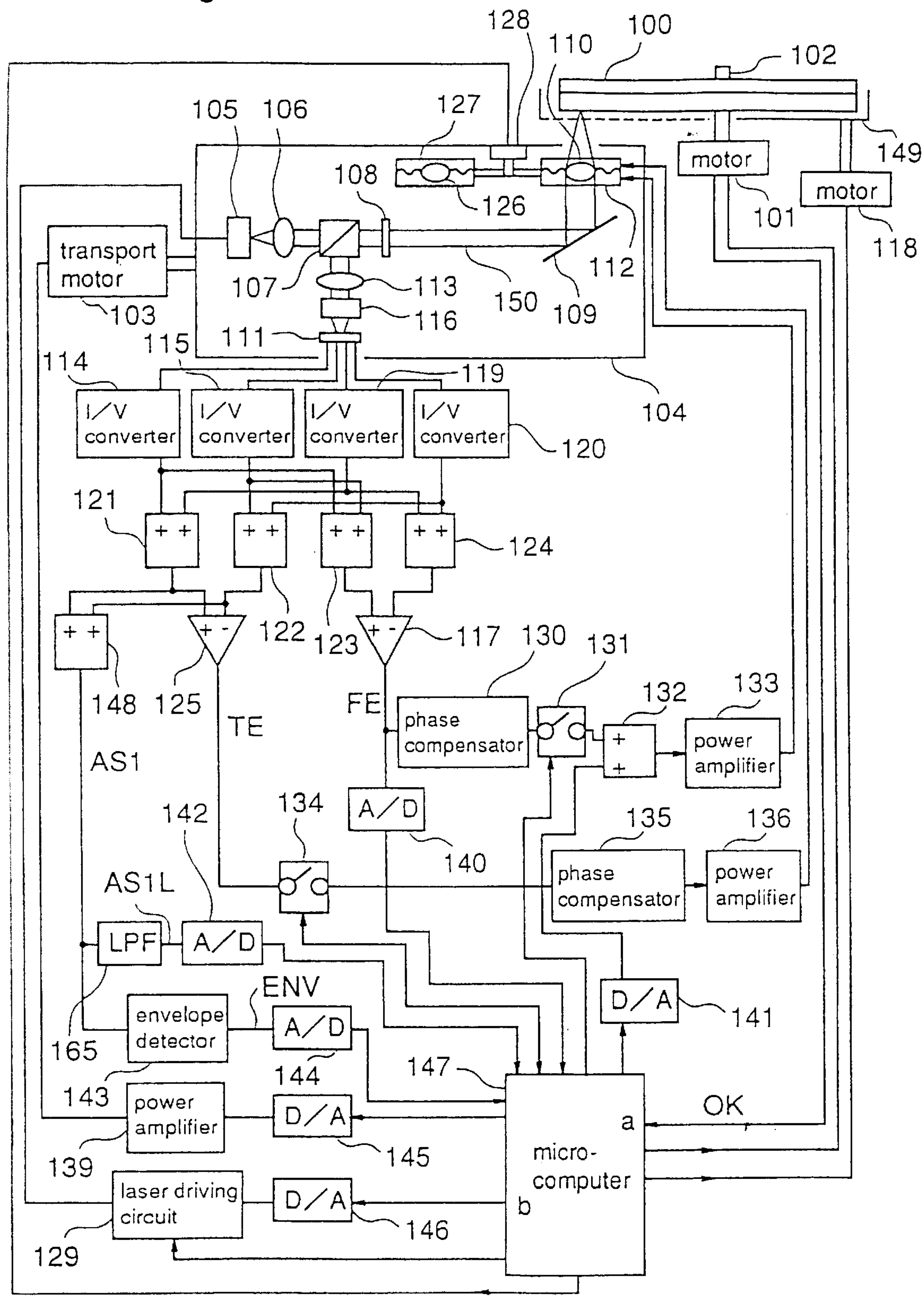
FIG. 1 is a block diagram illustrating an optical disk apparatus in accordance with a first embodiment of the present invention.

FIG. 1 is a block diagram illustrating an optical disk apparatus in accordance with a first embodiment of the present invention.

The optical disk apparatus according to this first embodiment of the invention can identify whether a disk set in the apparatus is a single-layer DVD, a double-layer DVD, a CD, or a CD-R. In FIG. 1, when a disk 100 is put on a tray 149, a microcomputer 147 drives a motor 118 to move the tray 149 so that the disk 100 is fixed to a rotation axis 102 of the motor 101.

Reference numeral 104 designates a transport stage. On the transport stage 104, a 650 nm laser 105, a coupling lens 106, a polarization beam splitter 107, a ¼ wavelength plate 108, a totally reflecting mirror 109, a photodetector 111, a motor 128, and actuators 112 and 127 are fixed. The transport stage 104 is movable in the radial direction of the disk 100, and the movement is controlled by a transport motor 103, such as a linear motor.

A light beam emitted from the laser 105 on the transport stage 104 is converted to a parallel light beam by the coupling lens 106. The parallel light beam travels through the polarization beam splitter 107 and the ¼ wavelength plate 108 and is reflected by the totally reflecting mirror 109. The reflected light is conversed by the focusing lens 110 on an information surface of the disk 100. The focusing lens 110 and the actuator 112 are used when a DVD is reproduced. When a CD is reproduced, the focusing lens 110 and the actuator 112 for the DVD are changed to the focusing lens 126 and the actuator 127 for the CD by the motor 128. Although the CD is reproduced using a 780 nm laser in a conventional apparatus for reproducing the CD only, in the optical disk apparatus shown in FIG. 1 the 650 nm laser 105 is employed and the focusing lens 126 for the CD is designed with regard to this wavelength (650 nm) and the base material thickness of the CD (1.2 mm).

The light beam reflected by the information surface of the disk 100 travels through the focusing lens 110 and is reflected by the totally reflecting mirror 109. The reflected light travels through the ¼ wavelength plate 108, the polarization beam splitter 107, the detector lens 113, and the cylindrical lens 116, and irradiates the photodetector 111 that is divided into four. The focusing lens 110 is fixed to a moving part of the actuator 112. The actuator 112 is composed of a coil for focusing, a coil for tracking, a permanent magnet for focusing, and a permanent magnet for tracking (these elements are not shown in the figure). Therefore, when a voltage is applied to the focusing coil of the actuator 112 using a power amplifier 133, a current flows through this coil and a magnetic force is applied to this coil from the permanent magnet for focusing, whereby the focusing lens 110 moves in the direction perpendicular to the surface of the disk 100. In the figure, the lens 110 moves up and down. In this way, the focusing lens 110 is controlled so that the focal point of the light beam is always positioned on the information surface of the disk 100, in response to a focusing error signal that represents an error between the focal point of the light beam and the information surface of the disk.

When a voltage is applied to the tracking coil of the actuator 112 using a power amplifier 136, a current flows through this coil and a magnetic force is applied to this coil from the permanent magnet for tracking, whereby the focusing lens 110 moves in the radial direction of the disk 100, i.e., the direction transverse to the track on the disk 100. In the figure, the lens 110 moves right and left.

The light beam reflected by the disk 100 and applied to the photodetector 111 is converted to current by the photodetector 111 that is divided into four and input to I/V converters 114, 115, 119, and 120. Each I/V converter converts the input current into a voltage in response to the current level. Voltage signals output from the I/V converters 114, 115, 119, and 120 are input to adders 121, 122, 123, and 124 in such a manner that two of the signals output from the I/V converters are input to each adder. Each adder adds the input two signals. Signals output from the adders 121, 122, 123, and 124 are input to differential amplifiers 125 and 117 in such a manner that two of the signals output from the adders are input to each differential amplifier. The differential amplifier 117 receives signals output from the adders 123 and 124 and calculates a difference between these signals.

The optical system shown in FIG. 1 constitutes a focusing error detection system that is generally called an astigmatic method. So, an output from the differential amplifier 117 becomes a focusing error signal (hereinafter referred to as an FE signal) that represents an error between the focal point of the light beam 150 and the information surface of the disk 100. This FE signal is transmitted through a phase compensator 130, a switch 131, and an adder 132 to the power amplifier 133, and a voltage is applied to the focusing coil (not shown) of the actuator 112 by the power amplifier 133. The phase compensator 130 makes the focusing control system stable. In this way, the focal point of the light beam is always positioned on the information surface of the disk 100 by moving, in response to the FE signal, the focusing lens 110 or the focusing lens 126 when the focusing lens 110 is changed to the focusing lens 126.

The differential amplifier 125 receives signals output from the adders 121 and 122 and calculates a difference between these signals. The optical system shown in FIG. 1 constitutes a tracking error detection system that is generally called a push-pull method. Therefore, an output from the differential amplifier 125 becomes a tracking error signal (hereinafter referred to as a TE signal) that represents an error between the focal point of the light beam 150 and the track on the disk 100. This TE signal is transmitted through a switch 134 and a phase compensator 135 to the power amplifier 136, and an output from the power amplifier 136 is applied to the tracking coil (not shown) of the actuator 112 as a voltage. The phase compensator 135 makes the tracking control system stable. In this way, the focal point of the light beam is always positioned on the track of the disk 100 by moving the focusing lens 110 or the focusing lens 126 in response to the TE signal.

An output from an adder 148 is a signal obtained by adding all the signals output from the photodetector 111, and this signal shows an amount of totally reflected light from the disk 100. Hereinafter, this signal is called an AS1 signal. This AS1 signal changes according to presence and absence of the pits on the disk. This AS1 signal showing the amount of totally reflected light is sent to an envelope detector 143 and to a signal processing circuit (not shown) for demodulating information.

The envelope detector 143 outputs a signal level of an a.c. component produced by the pits on the disk. Hereinafter, this output signal is called an ENV signal. A low-pass filter 165 (hereinafter referred to as LPF) eliminates the a.c. component from the AS1 signal, and an AS1 signal passing through the LPF 165 is called an AS1L signal. The AS1L signal, the ENV signal, and the FE signal are converted to digital signals by A/D (analog to digital) converters 142, 144, and 140, respectively, and sent to the microcomputer 147.

A description is now given of the operation of the optical disk apparatus shown in FIG. 1.

When the disk 100 is put on the tray 149, the microcomputer 147 drives the motor 118 so that the disk 100 is fixed to the rotation axis 102 of the motor 101.

Next, the microcomputer 147 sets a prescribed value in a D/A (digital to analog) converter 145 to drive the transport motor 103 through the power amplifier 139 so that the transport stage 104 moves toward the inner circumference of the disk 100, and drives the motor 128 to select the focusing lens 110 and the actuator 112 for the DVD.

Further, the microcomputer 147 rotates the motor 101. The rotating speed of the motor 101 is set at a rotating speed normalized for reproduction of information on an inner circumference of a DVD. When the motor 101 reaches the rotating speed, the motor 101 sends an OK signal to a terminal a of the microcomputer 147. Receiving the OK signal, the microcomputer 147 sends a command through a terminal b to a laser driving circuit 129 so as to make the laser 105 emit light. Meanwhile, the microcomputer 147 sets a radiant intensity of the laser 105, through a D/A converter 146, in the laser driving circuit 129. This radiant intensity must be sufficiently low so that the information recorded in the disk 100 is not destroyed when the disk 100 is a CD-R.

Further, the microcomputer 147 sets a prescribed value in a D/A converter 141 to drive the focusing lens 110 through the adder 132 and the power amplifier 133 so that the focusing lens 110 moves once downward and then gradually upward, that is, once away from the disk 100 and then toward the disk 100. At this time, the switches 131 and 134 are open so that the focusing coil and tracking coil of the actuator 112 are not driven in response to the FE signal and the TE signal. Thereafter, the microcomputer 147 receives the FE signal, the AS1L signal, and the ENV signal through the A/D converters 140, 142, and 144, respectively, while the focusing lens 110 moves, and the microcomputer 147 identifies whether the disk 100 set in the apparatus is a single-layer DVD, a double-layer DVD, a CD, or a CD-R on the basis of the FE signal, the AS1L signal, and the ENV signal.

When the disk 100 is identified as a CD-R, since there is the risk of destruction of information recorded on the disk 100, the microcomputer 147 drives the motor 118 to move the tray 149 so that the disk 100 is ejected from the apparatus. When the disk 100 is identified as a CD, the microcomputer 147 drives the motor 128 to change the actuator 112 and the focusing lens 110 to the actuator 127 and the focusing lens 126 for the CD.

Next, the microcomputer 147 controls the laser driving circuit 129 to set the radiant intensity of the laser 105 at an appropriate value for the disk 100, i.e., a CD or a DVD. Thereafter, the microcomputer 147 sets the output from the D/A converter 141 at zero and closes the switches 131 and 134 to make loops. Using the loops, the microcomputer 147 controls the actuator 112 with outputs from the power amplifiers 133 and 136 to perform focusing and tracking, respectively, whereby information recorded on the disk 100 is reproduced.

The discrimination of the disk using the microcomputer 147 is performed only when a disk 100 is newly fixed to the rotation axis 102 of the motor 101. In the case where reproduction of information in the disk is halted temporarily and then started again, discrimination of the disk is not performed. Therefore, the rising time when the reproduction is started again can be reduced.

A description is now given of the FE signal, the AS1 signal, the AS1L signal, and the ENV signal.

FIGS. 2(*a*), 2(*b*), 2(*c*), and 2(*d*) show waveforms of the FE signal, the AS1 signal, the AS1L signal, and the ENV signal, respectively, when the focusing lens 110 gradually moves upward in the case where a single-layer DVD is set in the optical disk apparatus. FIG. 2(*e*) shows the position of the focal point F. In these figures, the ordinate shows signal level, and the abscissa shows time. The FE signal, the AS1 signal, the AS1L signal, and the ENV signal vary when the focal point of the light beam irradiating the disk passes through the information surface, i.e., the A1 reflecting film. The FE signal becomes 0 at the time t1 when the focal point of the light beam is on the information surface of the disk. The waveform of the FE signal when the focal point of the light beam passes through the information surface of the disk is generally called a S curve. The AS1 signal gradually increases as the focal point of the light beam approaches the information surface of the disk and gradually decreases as the focal point goes away from the information surface. In addition, the AS1 signal changes according to presence and absence of the pits on the disk. The AS1L signal is a signal obtained by averaging the level changes of the AS1 signal due to the pits on the disk. The ENV signal is a signal showing the level change of the amount of the reflected light due to presence and absence of the pits on the disk. The position of the focal point F of the light beam shown in FIG. 2(*e*) is determined by the signal level output from the microcomputer 147 and input to the D/A converter 141.

As shown in FIG. 2(*e*), the microcomputer 147 moves the focal point F of the light beam slowly in the period from t0 to t2 because the slow movement of the focal point makes the change of the signal level gentle, whereby accurate measurement of the respective signals is possible. In the period from t0 to t2, the AS1L signal exceeds a reference value w because, in this period, the focal point of the light beam is in the vicinity of the information surface of the disk. Therefore, in the period from t0 to t2, the focal point F of the light beam is moved slowly to measure the respective signals accurately, whereby the time required for discriminating the disk is reduced.

Next, a method of discriminating the disk using the microcomputer 147 in response to the FE signal, the AS1L signal, and the ENV signal will be described.

Figure 3:
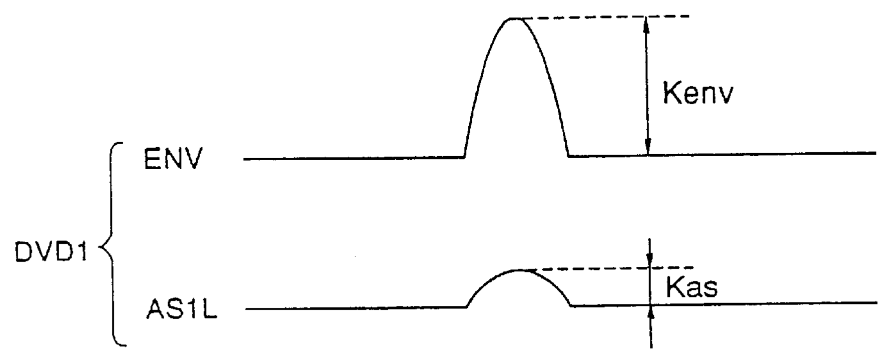
FIGS. 3(*a*)–3(*d*) are waveforms of ENV signals and AS1L signals in a single-layer DVD, a double-layer DVD, a CD, and a CD-R, respectively, for explaining a disk discriminating process according to the first embodiment of the invention.
Figure 3:
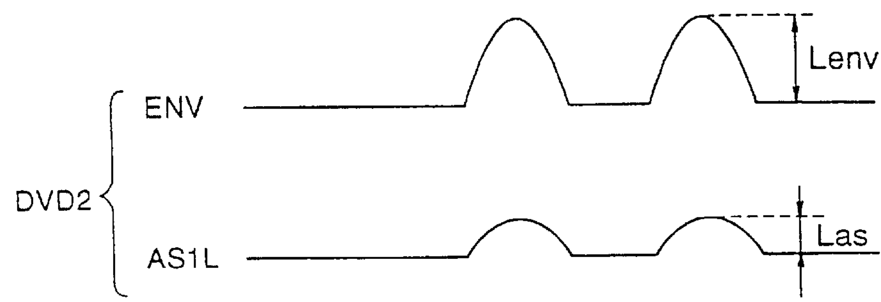
Figure 3:
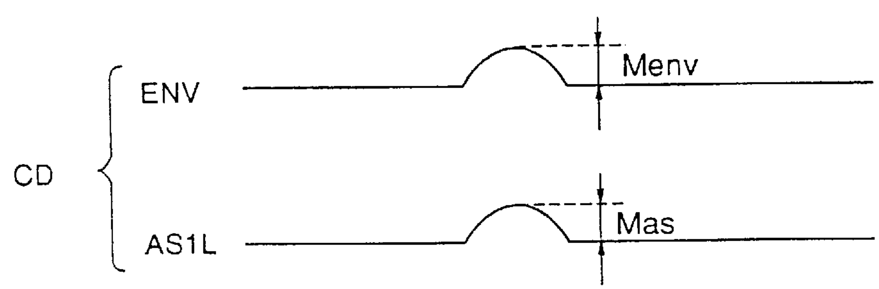
Figure 3:
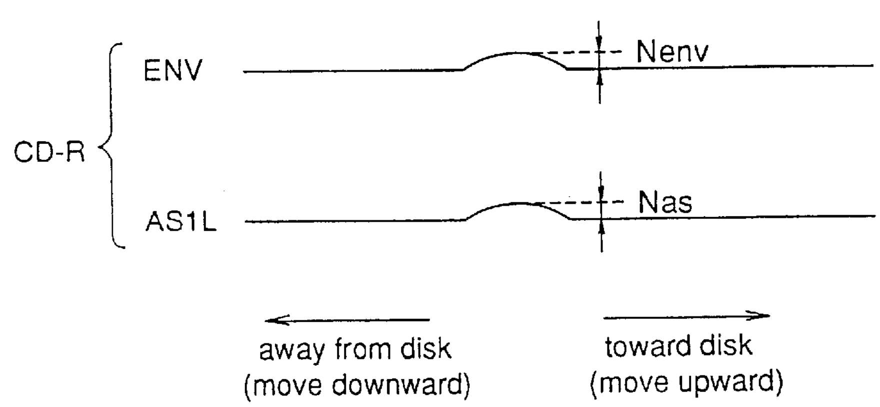

The microcomputer 147 calculates the maximum values of the FE signal, the AS1L signal, and the ENV signal. FIGS. 3(*a*), 3(*b*), 3(*c*), and 3(*d*) show waveforms of the ENV signal and the AS1L signal when the focusing lens 110 gradually moves upward, for a single-layer DVD (DVD1), a double-layer DVD (DVD2), a CD, and a CD-R, respectively. In these figures, the ordinate shows signal level, and the abscissa shows time.

In FIG. 3(*a*), Kenv and Kas show the maximum values of the ENV signal and the AS1L signal, respectively, within a period of time where the focusing lens 110 moves. Likewise, Lenv and Las in FIG. 3(*b*), Menv and Mas in FIG. 3(*c*), and Nenv and Nas in FIG. 3(*d*) show the maximum values.

The level of the ENV signal and the level of the AS1L signal attain maximum values in the single-layer DVD and minimum values in the CD-R. The level of the ENV signal and the level of the AS1L signal in the double-layer DVD are lower than those in the single-layer DVD because the reflectivity of the first layer of the double-layer DVD (about 35%) is lower than the reflectivity of the single-layer DVD (about 90%).

Further, the ENV signal level Menv in the CD is lower than the ENV signal levels Kenv and Lenv in the single-layer DVD and the double-layer DVD because the ENV signal in the CD is measured using the optical system for the DVD.

Furthermore, differences in the ENV signal levels (Menv and Nenv) and in the AS1L signal levels (Mas and Nas) between the CD and the CD-R are attributed to the fact that the absorptivity of the CD-R for 650 nm light is higher than that of the CD.

The microcomputer 147 stores Pas that satisfies the relationships, Nas<Pas<Mas, Nas<Pas<Las, and Nas<Pas<Kas, and compares the maximum value of the AS1L signal with Pas after the calculation of the maximum values of the FE signal, the AS1L signal, and the ENV signal. When the maximum value of the AS1L signal is lower than Pas, the microcomputer 147 identifies the disk in the apparatus as a CD-R. In this case, the microcomputer 147 drives the motor 118 to move the tray 149 so that the disk 100, i.e., the CD-R, is ejected from the apparatus.

Next, the microcomputer 147 calculates Kenv/Kas, Lenv/Las, Menv/Mas, and Nenv/Nas. The object of this division of the maximum value of the ENV signal by the maximum value of the AS1L signal is to absorb influences on the maximum value of the ENV signal due to variations in the reflectivity of the disk 100 or in the radiant intensity of the laser 105. According to an experiment, this value is about 6 in the DVD (single-layer DVD and the double-layer DVD) and about 2 in the CD. Therefore, when this value is larger than 4, the microcomputer 147 identifies the disk set in the apparatus as a DVD. When this value is lower than 4, the disk is identified as a CD. However, since the result of the division changes when the amplification factors of the AS1L signal and the ENV signal change, the value for comparison must be changed according to the amplification factors.

When the disk set in the optical disk apparatus is identified as a CD, the microcomputer 147 drives the motor 128 to change the actuator 112 and the focusing lens 110 to the actuator 127 and the focusing lens 126 for the CD.

When the disk set in the apparatus is identified as a DVD, the microcomputer 147, which stores Qenv that satisfies the relationship of Lenv<Qenv<Kenv, compares the measured ENV signal with Qenv. According to the result of the comparison, the microcomputer 147 performs the discrimination between a single-layer DVD and a double-layer DVD.

Although the discrimination between a single-layer DVD and a double-layer DVD is performed using the maximum value of the ENV signal in this first embodiment of the invention, it may be performed using the maximum amplitude of the FE signal or the maximum value of the AS1L signal because there is a difference in the amplitude level of the FE signal or the AS1L signal level between the single-layer DVD and the double-layer DVD due to the difference in reflectivities between these DVDs.

Further, although the discrimination of the CD-R is performed using the AS1L signal level in this first embodiment of the invention, it may be performed using the FE signal level or the ENV signal level because the FE signal level and the ENV signal level in the CD-R are lower than those in the CD due to the difference in absorptivities between the CD-R and the CD.

In this first embodiment of the invention, the discrimination between a CD and a DVD is performed on the basis of the value obtained by dividing the maximum value of the ENV signal by the maximum value of the AS1L signal. According to the experiment, the maximum value of the ENV signal in the double-layer DVD, which is measured with the lens for the DVD, is larger than the maximum value of the ENV signal in the CD, which becomes small because it is measured with the lens for the DVD though it should be measured with the lens for the CD. So, it is possible to identify whether the disk in the apparatus is a single-layer DVD, a double-layer DVD, a CD, or a CD-R on the basis of the maximum value of the ENV signal. More specifically, the discrimination between a single-layer DVD and a double-layer DVD is performed using a difference in the reflectivities, and the discrimination between a DVD and a CD is performed using a difference in detected output signals caused by that an optimum detection lens for the substrate thickness is not used. Further, the discrimination between a CD and a CD-R is performed using a difference in the absorptivities. When the discrimination is performed on the basis of the maximum value of the ENV signal, since the division is not necessary, the processing of the microcomputer 147 is simplified.

In this first embodiment of the invention, the radiant intensity of the laser 105 is maintained low so that the information on the disk is not destroyed when the disk is a CD-R. However, after it is found by the first vertical movement of the focusing lens 110 that the disk Is not a CD-R, the radiant intensity of the laser 105 may be increased and the focusing lens 110 is moved again to identify whether the disk is a DVD or a CD. Since the level of the detected signal can be made higher than noise level by increasing the radiant level of the laser, the precision in the discrimination is significantly improved.

Although the discrimination of the disk is performed using the optical system for the DVD, it may be performed using the optical system for the CD. In this case, however, since the high-low relationships of the ENV signal and the FE signal are inverted, the conditions for the discrimination must be changed.

Further, in this first embodiment of the invention, the focusing lens 110 once moves downward and then gradually approaches the disk 100 and, during the approach of the lens 110 to the disk 100, the FE signal, the ENV signal, and the AS1L signal are measured. However, these signals may be measured when the focusing lens 110 gradually moves downward away from the disk 100.

As described above, according to the first embodiment of the present invention, the maximum values of the AS1L signal and the ENV signal are measured, and the maximum value of the ENV signal is divided by the maximum value of the AS1L signal and, thereafter, the result is compared with a predetermined reference value. Therefore, it is possible to discriminate between a DVD having a thin base substrate and a CD having a thick base substrate.

Since the maximum value of the AS1L signal is compared with a prescribed reference value, the discrimination of a CD-R is performed with a simple structure.

Since the discrimination of the disk is performed with a light beam having an intensity lower than that for reproducing Information, even when the disk set in the apparatus is a CD-R, information recorded in the CD-R is not destroyed.

Since the maximum value of the ENV signal amplitude is compared with a prescribed reference value, the discrimination between a single-layer DVD and a double-layer DVD is performed with a simple structure.

Since the maximum value of the ENV signal amplitude is compared with a prescribed reference value, the discrimination between the DVD) having a thin base substrate and the CD having a thick base substrate is performed with a simple structure.

Since the discrimination of the disk is performed using the optical system for the disk having a thin base substrate, when the disk having a thin base substrate is set in the apparatus, the time interval required before reproduction of information in the disk is reduced.

Since the moving speed of the focusing lens 110 is reduced when the level of the AS1L signal exceeds the reference value W, the level change of the AS1L signal, the ENV signal, and the FE signal becomes gentle. Therefore, the microcomputer 147 can receive accurate maximum values of the amplitudes of the AS1L signal, the ENV signal, and the FE signal, whereby the discrimination of the disk is performed with high reliability.

Although the discrimination of the CD-R is performed using the maximum value of the AS1L signal in this first embodiment of the invention, it may be performed using the maximum amplitude of the FE signal because the amplitude level of the FE signal in the CD-R is lower than that in the CD due to a difference in absorptivities between the CD-R and the CD.

Furthermore, although the discrimination between a single-layer DVD and a double-layer DVD is performed using the maximum value of the ENV signal in this first embodiment of the invention, it may be performed using the maximum amplitude of the FE signal or the maximum value of the AS1L signal because there is a difference in the amplitude level of the FE signal or the AS1L signal level between the single-layer DVD and the double-layer DVD due to a difference in reflectivities between these DVDs.

[Embodiment 2]

Figure 4:
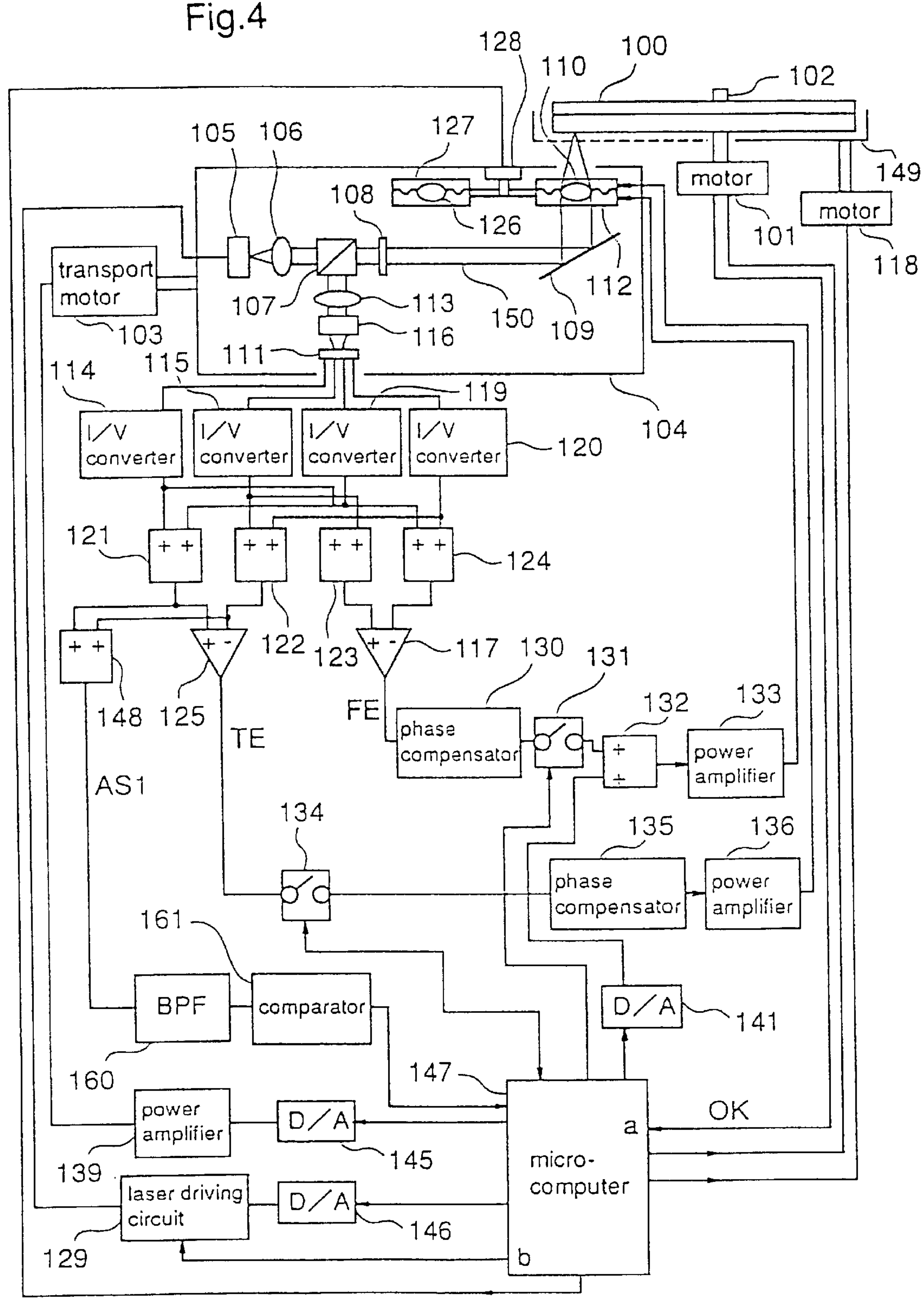
FIG. 4 is a block diagram illustrating an optical disk apparatus in accordance with a second embodiment of the present invention.

FIG. 4 is a block diagram illustrating an optical disk apparatus in accordance with a second embodiment of the present invention. In FIG. 4, the same reference numerals as those shown in FIG. 1 designate the same or corresponding parts. The optical disk apparatus according to this second embodiment of the invention can identify whether a disk set in the apparatus is a DVD or a CD. However, this apparatus cannot identify whether the disk is a single-layer DVD or a double-layer DVD.

The optical disk apparatus according to this second embodiment is identical to the optical disk apparatus according to the first embodiment except that a band-pass filter 160 and a comparator 161 are included. The band-pass filter 160 transmits signals with frequencies within certain designated ranges. The comparator 161 outputs a high level signal when an input signal level exceeds a prescribed value. Therefore, whether signals within the pass band of the band pass filter 160 are recorded in the disk 100 or not can be confirmed by the level of the output signal from the comparator 160. The pass band of the band pass filter 160 is set at about 4 MHz.

A description is given of the operation of the optical disk apparatus according to this second embodiment.

When the disk 100 is put on the tray 149, the microcomputer 147 drives the motor 118 so that the disk 100 is fixed to the rotation axis 102 of the motor 101.

Next, the microcomputer 147 sets a prescribed value in a D/A (digital to analog) converter 145 to drive the transport motor 103 through the power amplifier 139 so that the transport stage 104 moves toward the inner circumference of the disk 100, and drives the motor 128 to select the focusing lens 110 and the actuator 112 for the DVD. Then, the microcomputer 147 rotates the motor 101. The rotating speed of the motor 101 is set at a rotating speed normalized for reproduction of information on an inner circumference of a DVD. Further, the microcomputer 147 sets a value in the D/A converter 141 to move the focusing lens 110 once downward and then gradually upward toward the disk 100. At this time, the switches 131 and 134 are open so that the focusing coil and tracking coil of the actuator 112 are not driven in response to the FE signal and the TE signal. The operation described above is similar to the operation according to the first embodiment.

A description is now given of a method for discriminating a disk according to this second embodiment.

The maximum frequency of signals recorded in a DVD is about 4 MHz, and the linear velocity of the DVD is about 3.3 m/s. In a CD, the linear velocity is about 1.3 m/s, and the maximum frequency of reproduced signals is about 700 KHz. So, when the CD is rotated with the linear velocity of the DVD, the maximum frequency is given by 700 KHz×(3.27/1.3)−1.8 MHz. Therefore, if the output from the comparator 161 becomes high level when the focusing lens moves, it is found that a signal component of 4 MHz is included in the detected signal, and the disk set in the apparatus is identified as a DVD. The operation after the discrimination of the disk is similar to the operation according to the first embodiment.

Figure 5:
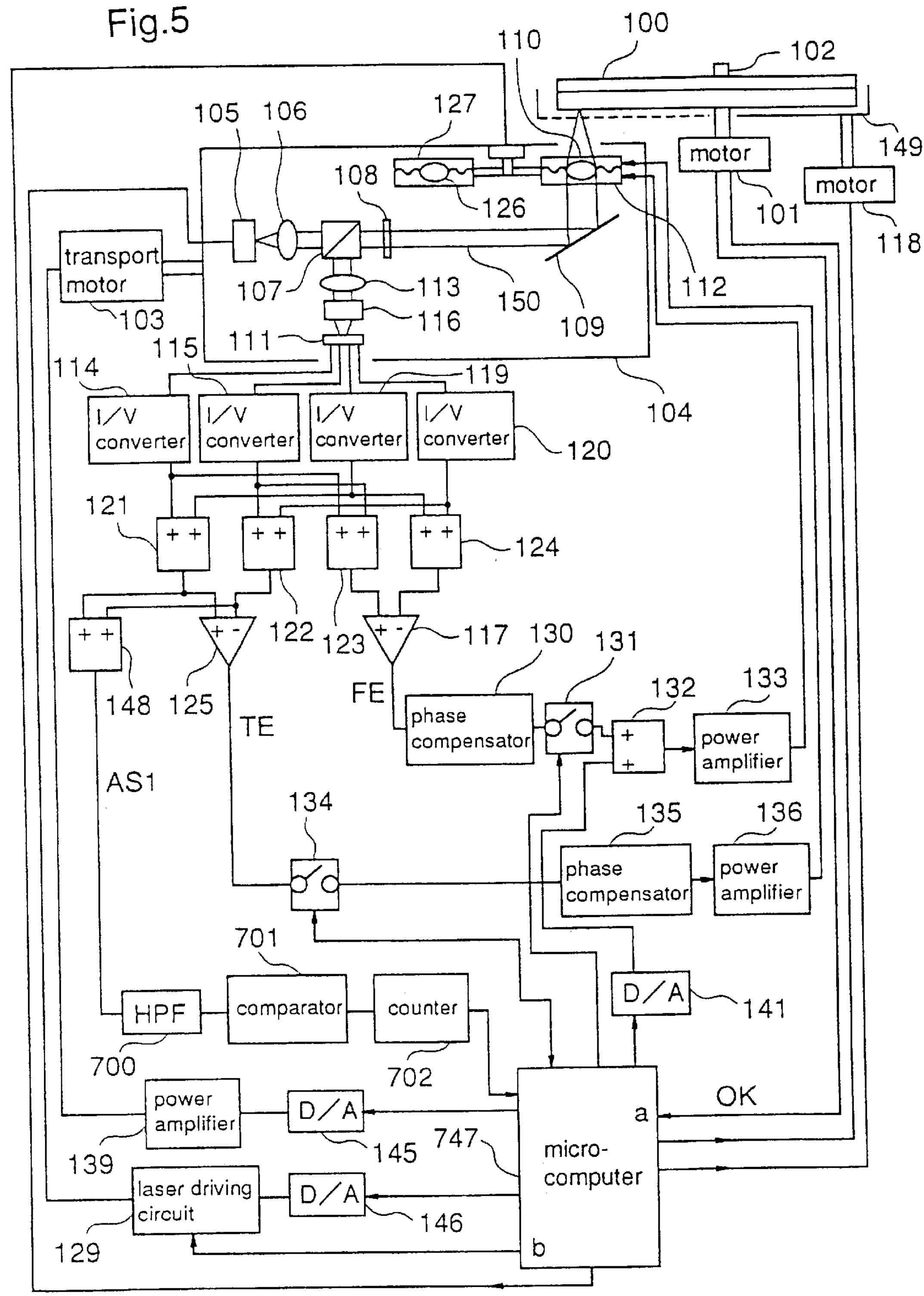
FIG. 5 is a block diagram illustrating an optical disk apparatus in accordance with a modification of the second embodiment of the invention.

In this second embodiment of the invention, the band-pass filter 160 that transmits the signal component of 4 MHz is employed, and an output from the band-pass filter 160 is input to the comparator 161 to detect whether the output from the band-pass filter 160 includes the signal component of 4 MHz or not, whereby the discrimination of the disk 100 set in the apparatus is performed. However, the detection of the signal component of 4 MHz may be performed by digitizing the input signal to the band-pass filter 160 and measuring the high-level or low-level period of the signal. When the disk 100 is a DVD, the high-level or low-level period is about 125 ns. FIG. 5 shows a block diagram of an optical disk apparatus in this case.

The apparatus shown in FIG. 5 is different from the apparatus shown in FIG. 4 in that it includes a high-pass filter 700 (hereinafter referred to as HPF) receiving the AS1 signal output from the adder 148, a comparator 701 receiving an output from the HPF 700, a counter 702 receiving an output from the comparator 701, and a microcomputer 747 receiving an output from the counter 702. The HPF 700 transmits only a high frequency component of an input signal. The cut-off frequency of the HPF 700 is determined so as to transmit a frequency component of information recorded in the disk 100. Therefore, the frequency component of the information recorded in the disk 100 is input to the comparator 701. The comparator 701 is a digital circuit that converts an input signal to a high-level signal or a low-level signal with a zero level as a reference. Therefore, an output from the comparator 701 is a signal obtained by digitizing the signal component of the information recorded in the disk 100. The counter 702 measures the period of the high-level or low-level of the input signal and sends the measured value to the microcomputer 747. When the measured value input to the microcomputer 747 is near 125 ns, the microcomputer 747 identifies the disk set in the apparatus as a DVD because 125 ns corresponds to a signal component of 4 MHz. The operation of the microcomputer 747 other than the discrimination of the disk using the measured value is similar to the operation of the microcomputer 147.

As described above, in the optical disk apparatus shown in FIG. 4, whether the AS1 signal corresponding to the amount of the reflected light from the disk 100 includes a signal component of a prescribed frequency or not is detected by the band-pass filter 160 and the comparator 161, whereby discrimination between a DVD having a high track recording density and a CD having a low track recording density is possible.

Furthermore, in the optical disk apparatus shown in FIG. 5, whether the AS1 signal corresponding to the amount of the reflected light from the disk 100 includes a signal component of a prescribed frequency or not is detected by the high-pass filter 700, the comparator 701, and the counter 702, whereby discrimination between a DVD having a high track recording density and a CD having a low track recording density is possible.

[Embodiment 3]

Figure 6:
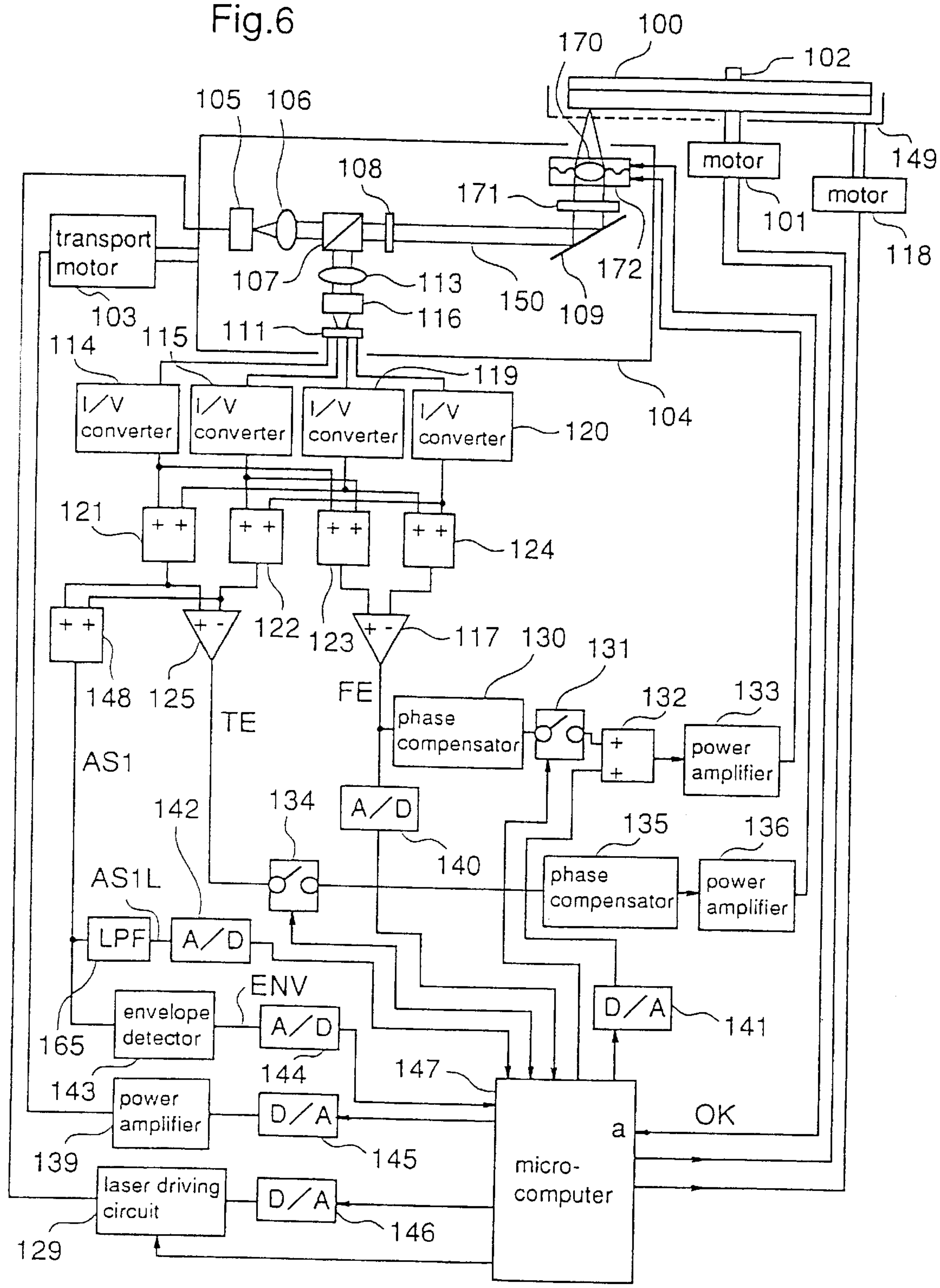
FIG. 6 is a block diagram illustrating an optical disk apparatus in accordance with a third embodiment of the present invention.

FIG. 6 is a block diagram illustrating an optical disk apparatus in accordance with a third embodiment of the present invention. In FIG. 6, the same reference numerals as those shown in FIG. 1 designate the same or corresponding parts. The apparatus according to this third embodiment is identical to the apparatus according to the first embodiment except that an actuator 172, a focusing lens 170, and a hologram 171 are employed in place of the actuators 112 and 127 and the focusing lenses 110 and 126.

Figure 7:
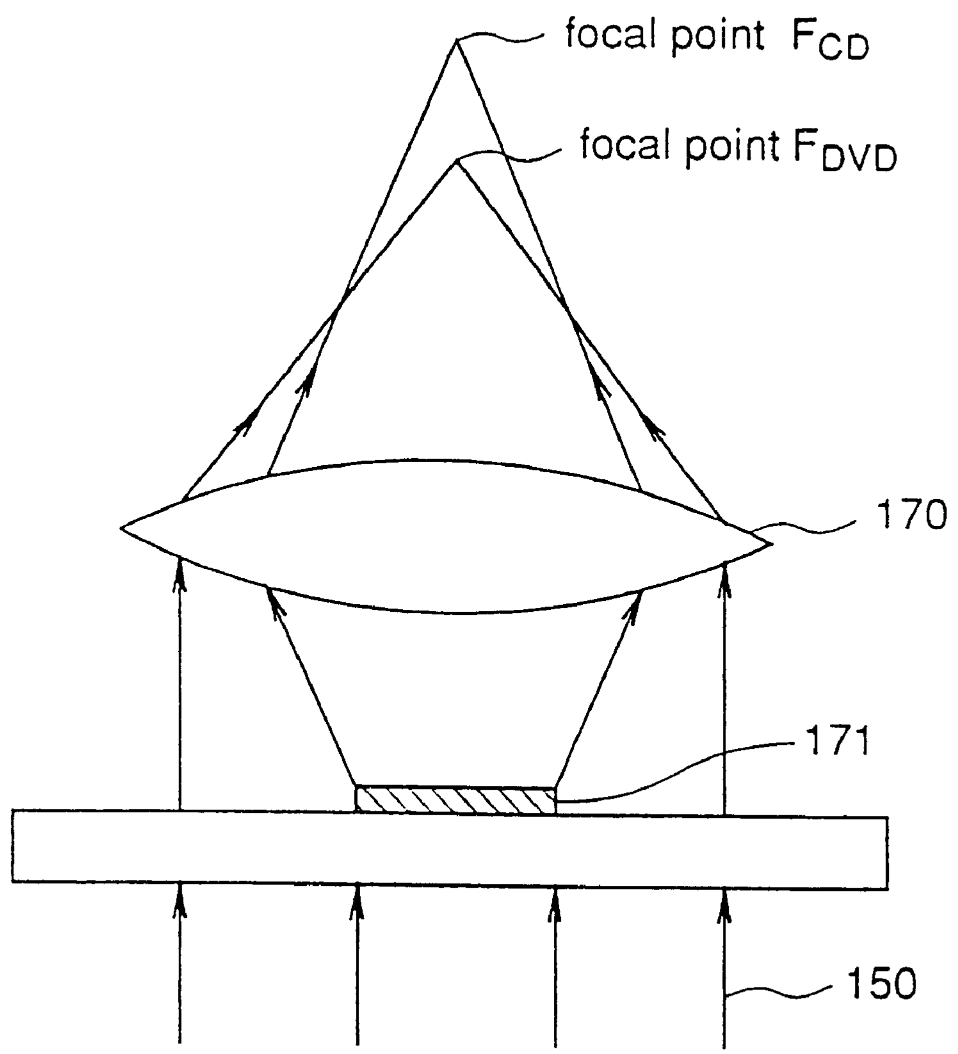
FIG. 7 is a schematic diagram illustrating an optical system having two focal points according to the third embodiment of the invention.

The optical system comprising the actuator 172, the focusing lens 170, and the hologram 171 will be explained with reference to a schematic diagram shown in FIG. 7. The hologram 171 is located in the center of the optical axis of the light beam 150. The light beam 150 traveling through the focusing lens 170 forms a focal point for the CD ($F_{CD}$) and a focal point for the DVD ($F_{DVD}$). The focal point $F_{CD}$ is more distant from the focusing lens 170 than the focal point $F_{DVD}$. The distance between the focal point $F_{CD}$ and the focal point $F_{DVD}$ is about 300 μm. In addition, the intensity of the focal point $F_{DVD}$ is about twice as high as the intensity of the focal point $F_{CD}$.

In FIG. 6, as in the first embodiment of the invention, when the disk 100 is put on the tray 149, the microcomputer 147 drives the motor 118 so that the disk 100 is fixed to the rotation axis 102 of the motor 101. Next, the microcomputer 147 drives the transport motor 103 through the power amplifier 139 to move the transport stage 104 toward the inner circumference of the disk 100. Then, the microcomputer 147 rotates the motor 101. The rotating speed of the motor 101 is set at a rotating speed normalized for reproduction of information on an inner circumference of a DVD. When the motor 101 reaches the set rotating speed, the motor 101 sends an OK signal to the terminal a of the microcomputer 147. Receiving the OK signal, the microcomputer 147 sets a value in the D/A converter 141 to move the focusing lens 170 once downward and then gradually upward. At this time, the switches 131 and 134 are open.

When the focusing lens 170 reaches the uppermost position, the microcomputer 147 discriminates the disk 100. As the result of the discrimination, when the disk 100 is identified as a CD-R, the microcomputer 147 drives the motor 118 to move the tray 149 so that the disk 100 is ejected from the apparatus. When the disk 100 is identified as a CD, the microcomputer 147 again moves the focusing lens 170 downward and then gradually upward, and closes the switch 131 at the timing when the ENV signal exceeds a prescribed level and the FE signal crosses the zero level for the first time, thereby performing the focusing control.

The reason why the moving direction of the focusing lens 170 is changed between the CD and the DVD when the focusing control is performed will be described hereinafter.

Figure 8:
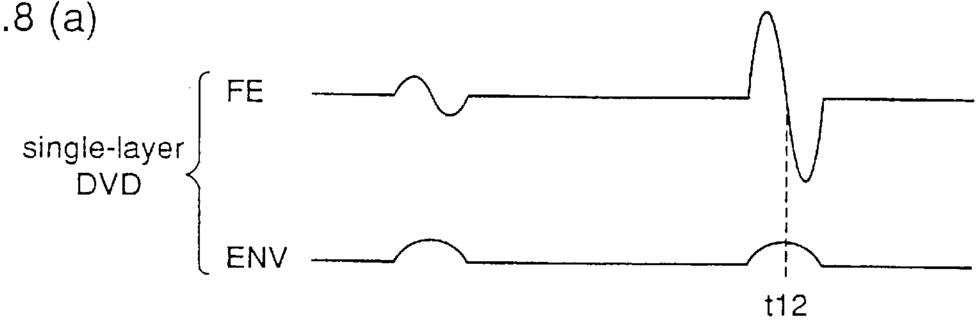
FIGS. 8(*a*)–8(*c*) are waveforms of FE signals and ENV signals in a single-layer DVD, a double-layer DVD, and a CD, respectively, according to the third embodiment of the invention.
Figure 8:
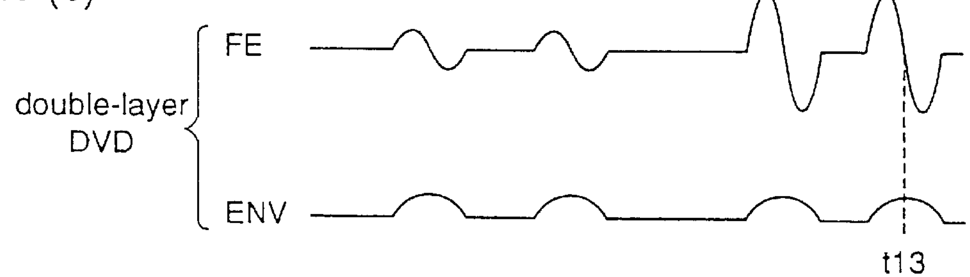
Figure 8:
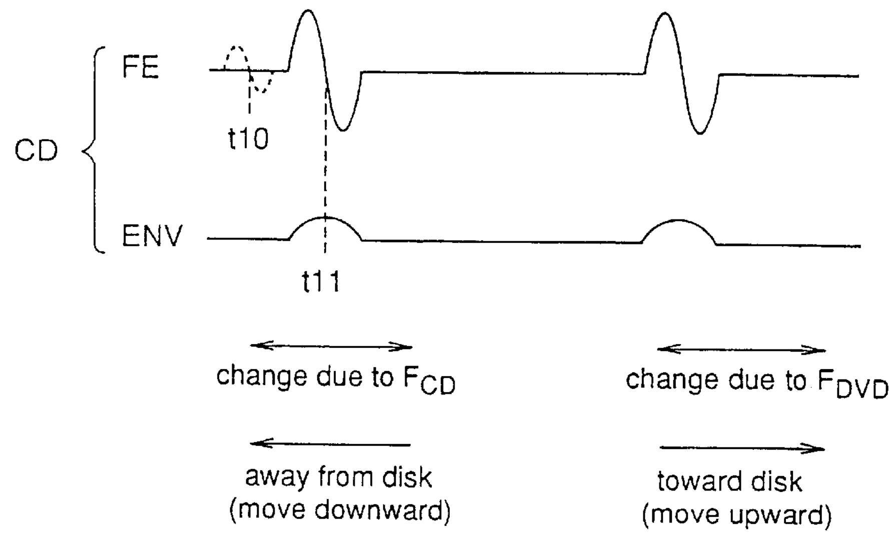

FIGS. 8(*a*)–8(*c*) show waveforms of the FE signal and the ENV signal when the focusing lens 170 moves once downward and then gradually upward. The abscissa shows time. In the optical system producing the two focal points $F_{CD}$ and $F_{DVD}$ shown in FIG. 7, the FE signal and the ENV signal change at the focal points $F_{CD}$ and $F_{DVD}$ In the singe-layer DVD shown in FIG. 8(*a*) and the double-layer DVD shown in FIG. 8(*b*), since the focal point $F_{CD}$ is more distant from the focusing lens 170 than the focal point $F_{DVD}$ as shown in FIG. 7, both the FE signal and the ENV signal change at the focal point $F_{CD}$ first (right side in the figure) and then at the focal point $F_{DVD}$ (left side in the figure). Therefore, when the disk 100 is a DVD, the focusing lens 170 is moved once upward and then gradually downward, and the focusing control is performed at the time when the FE signal crosses the zero level for the first time (time t12 shown in FIG. 8(*a*) for the single-layer DVD) or the second time (time t13 shown in FIG. 8(*b*) for the double-layer DVD). When the disk 100 is a CD, the focusing lens 170 is moved once downward and then gradually upward, and the focusing control is performed at the timing when the ENV signal exceeds a prescribed value and the FE signal crosses the zero level for the first time (time t11 in FIG. 8(*c*)) The reason why the ENV signal is taken as a condition for the CD shown in FIG. 8(*c*) is that the waveform shown by the dotted line (time t10) appears in the FE signal at the surface of the base substrate.

A description is now given of a method of discriminating the disk 100 using the microcomputer 147.

The microcomputer 147 receives the FE signal, the AS1L signal, and the ENV signal while the focusing lens 170 gradually moves upward, and measures the maximum values of these signals.

Figure 9:
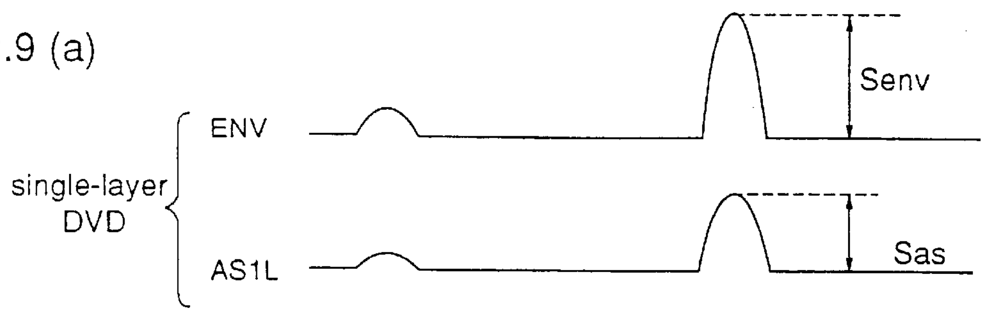
FIGS. 9(*a*)-9(*d*) are waveforms of ENV signals and AS1L signals in a single-layer DVD, a double-layer DVD, a CD, and a CD-R, respectively, for explaining a disk discriminating process according to the third embodiment of the invention.
Figure 9:
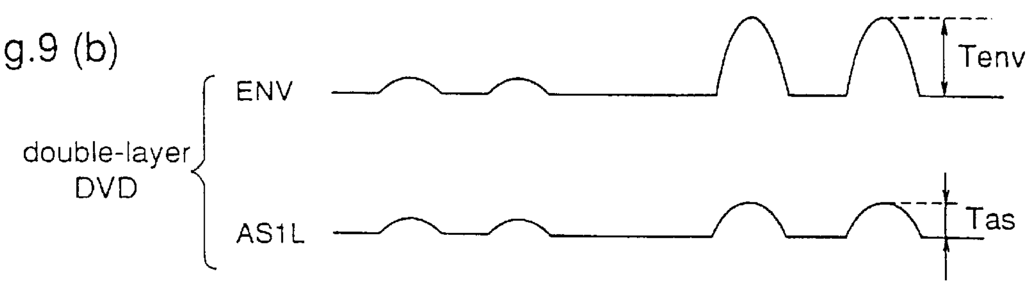
Figure 9:
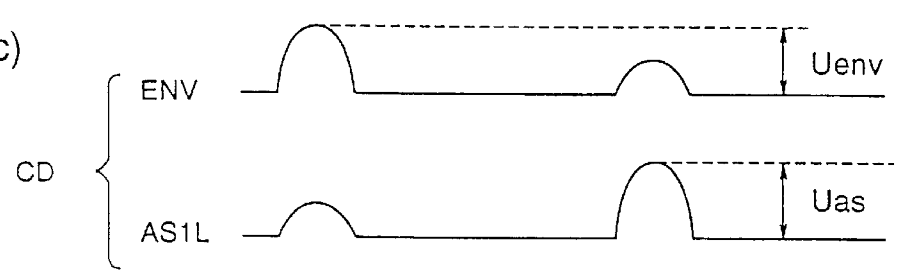
Figure 9:
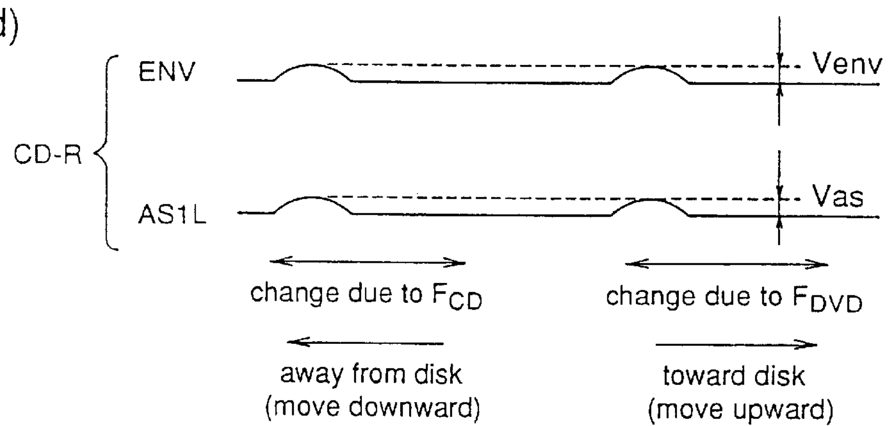

FIGS. 9(*a*)–9(*d*) show waveforms of the ENV signals and the AS1L signals in the single-layer DVD, the double-layer DVD, the CD, and the CD-R, respectively, when the focusing lens 170 gradually moves upward.

In FIGS. 9(*a*)–9(*d*), Senv, Tenv, Uenv, and Venv show the maximum values of the ENV signals, and Sas, Tas, Uas, and Vas show the maximum values of the AS1L signals, within the period of time during which the focusing lens 170 moves.

The ENV signal and the AS1L signal become high level when the focal point $F_{CD}$ and the focal point $F_{DVD}$ are on the information surface of the disk, respectively. Among the maximum values of the ENV signals, i.e., Senv, Tenv, Uenv, and Venv, in the single-layer DVD, the double-layer DVD, the CD, and the CD-R, respectively, Senv is the highest value, Tenv is approximately equal to Uenv, and Venv is the smallest value. Further, among the maximum values of the AS1L signals, i.e., Sas, Tas, Uas, and Vas, in the single-layer DVD, the double-layer DVD, the CD, and the CD-R, respectively, Sas and Uas are large and approximately equal to each other, Tas is smaller than Uas, and Vas is the smallest value. The reason why the maximum values Tenv and Tas in the double-layer DVD are smaller than the maximum values Senv and Sas in the single-layer DVD is that the reflectivity of the first layer of the double-layer DVD is lower than the reflectivity of the single-layer DVD.

The reason why the maximum level of the ENV signal due to the focal point $F_{CD}$ in the CD (Uenv) is lower than the maximum level of the ENV signal due to the focal point $F_{DVD}$ in the single-layer DVD (Senv) is that the amount of light at the focal-point $F_{CD}$ is about 50% of the amount of light at the focal point $F_{DVD}$. In addition, the reason why the maximum level of the ENV signal due to the focal point $F_{DVD}$ in the CD (Uenv) is lower than the maximum level of the ENV signal due to the focal point $F_{DVD}$ in the single-layer DVD (Senv) is that the focal point $F_{DVD}$ is designed for a 0.6 mm thick base substrate and, therefore, the light beam is defocused.

The differences in the ENV signals and the AS1L signals between the CD and the CD-R, i.e., the difference between Uenv and Venv and the difference between Usa and Vas, are caused by that the absorptivity of the CD-R for light of 650 nm wavelength is larger than that of CD.

The microcomputer 147 stores Was, in advance, that satisfies the relationships, Vas<Was<Uas, Vas<Was<Tas, and Vas<Was<Sas, and compares the maximum value of the AS1L signal with Was. When the maximum value is smaller than Was, the microcomputer 147 identifies the disk 100 set in the apparatus as a CD-R. In this case, the microcomputer 147 drives the motor 118 to move the tray 149 so that the disk 100 is ejected from the apparatus.

Then, the microcomputer 147 calculates Senv/Sas, Tenv/Tas, and Uenv/Uas. Senv/Sas is approximately equal to Tenv/Tas. Uenv/Uas is smaller than Senv/Sas and Tenv/Tas.

The microcomputer 147 stores a prescribed value Z in advance and compares a value obtained by dividing the maximum value of the ENV signal by the maximum value of the AS1L signal with the value Z, whereby the microcomputer 147 identifies whether the disk 100 set in the apparatus is a DVD or a CD.

A description is given of the value Z.

Figure 23:
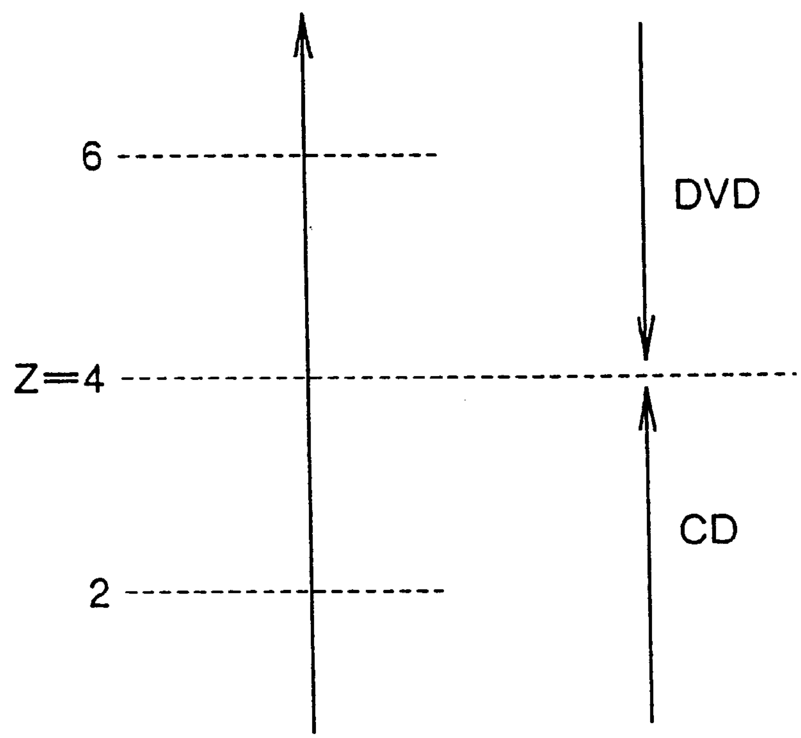
FIG. 23 is a diagram for explaining relationship between z value and disk discrimination according to the third embodiment of the invention.

Initially, Senv/Sas, Tenv/Tas, and Uenv/Uas are measured for a standard disk, and the value Z is determined on the basis of the result of the measurement. In an apparatus where the intensity of the focal point $F_{DVD}$ is about twice as high as the intensity of the focal point $F_{CD}$, the value Z is about 6 in the single-layer DVD and the double-layer DVD and about 2 in the CD. Therefore, Z takes a value between 2 and 6. In order to perform accurate discrimination of the disk even when the characteristics of the disk vary, Z is set at a value that satisfies 6/Z=Z/2. So, Z is about 4. FIG. 23 shows the relationship between the value Z and the disk. When the value obtained by dividing the maximum value of the ENV signal by the maximum value of the AS1L signal is larger than 4, the disk is identified as a DVD. When the value is smaller than 4, the disk is identified as a CD. However, since the result of the division varies with a difference in amplification factors between the ENV signal and the AS1L signal, when the amplification factors are changed, the value Z must be changed according to the amplification factors. Further, when the ratio of the intensity of the focal point $F_{DVD}$ to the intensity of the focal point $F_{CD}$ is changed, the value for the comparison must be changed according to the intensity ratio.

As described above, according to the third embodiment of the present invention, the maximum values of the AS1L signal and the ENV signal are measured, the maximum value of the ENV signal is divided by the maximum value of the AS1L signal, and the result of the division is compared with a prescribed reference value. Therefore, in an optical disk apparatus utilizing an optical head having two focal points, i.e., a focal point for reproducing a disk of a thick base substrate and a focal point for reproducing a disk of a thin base substrate, it is possible to discriminate between a DVD having a thin base substrate and a CD having a thick base substrate.

Further, when the microcomputer 147 identifies the disk 100 set in the apparatus is a CD having a thick base substrate, the microcomputer 147 sets a prescribed value in the D/A converter 141 to move the focusing lens 170 toward the disk 100. Meanwhile, the microcomputer 147 detects the timing for performing the focusing control and closes the switch 131 at this timing, thereby performing the focusing control. Therefore, in the optical disk apparatus utilizing an optical head having two focal points, i.e., a focal point for reproducing a disk of a thick base substrate and a focal point for reproducing a disk of a thin base substrate, the focusing control can be normally performed for the CD.

Furthermore, when the microcomputer 147 identifies the disk 100 as a DVD having a thin base substrate, the microcomputer 147 sets a prescribed value in the D/A converter 141 to move the focusing lens 170 downward, i.e., away from the disk 100. Meanwhile, the microcomputer 147 detects the timing for performing the focusing control and closes the switch 131 at this timing, thereby performing the focusing control. Therefore, in the optical disk apparatus utilizing an optical head having two focal points, i.e., a focal point for reproducing a disk of a thick base substrate and a focal point for reproducing a disk of a thin base substrate, the focusing control can be normally performed regardless of the thickness of the base substrate.

[Embodiment 4]

Figure 10:
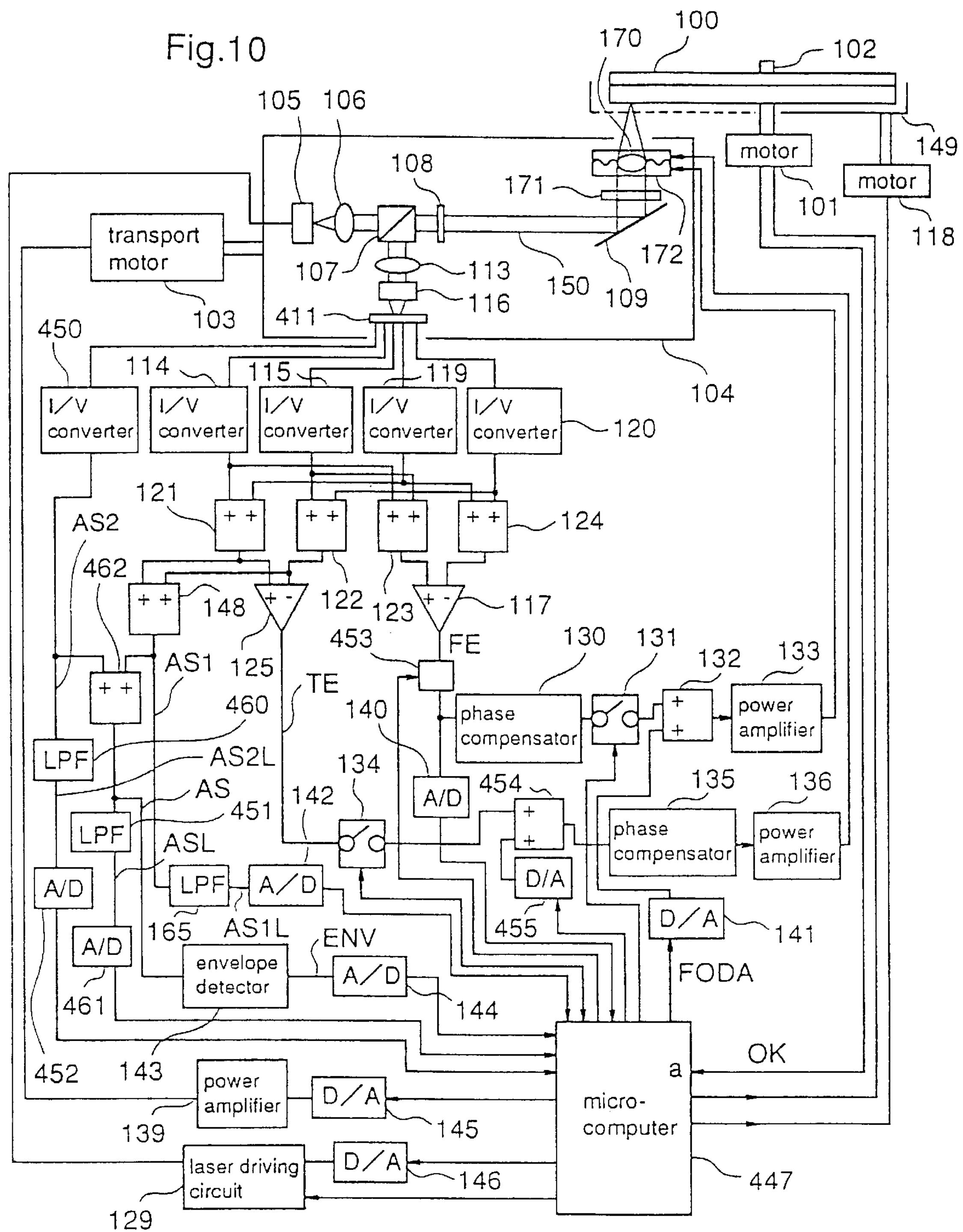
FIG. 10 is a block diagram illustrating an optical disk apparatus in accordance with a fourth embodiment of the present invention.

FIG. 10 is a block diagram illustrating an optical disk apparatus in accordance with a fourth embodiment of the present invention. In FIG. 10, the same reference numerals as those shown in FIG. 6 designate the same or corresponding parts. Reference numeral 411 designates a photodetector, numeral 447 designates a microcomputer, numeral 450 designates an I/V converter, numeral 451 designates a low-pass filter, numerals 452 and 461 designate A/D converters, numeral 453 designates a variable amplifier, numerals 454 and 462 designate adders, and numeral 455 designates a D/A converter.

Figure 11:
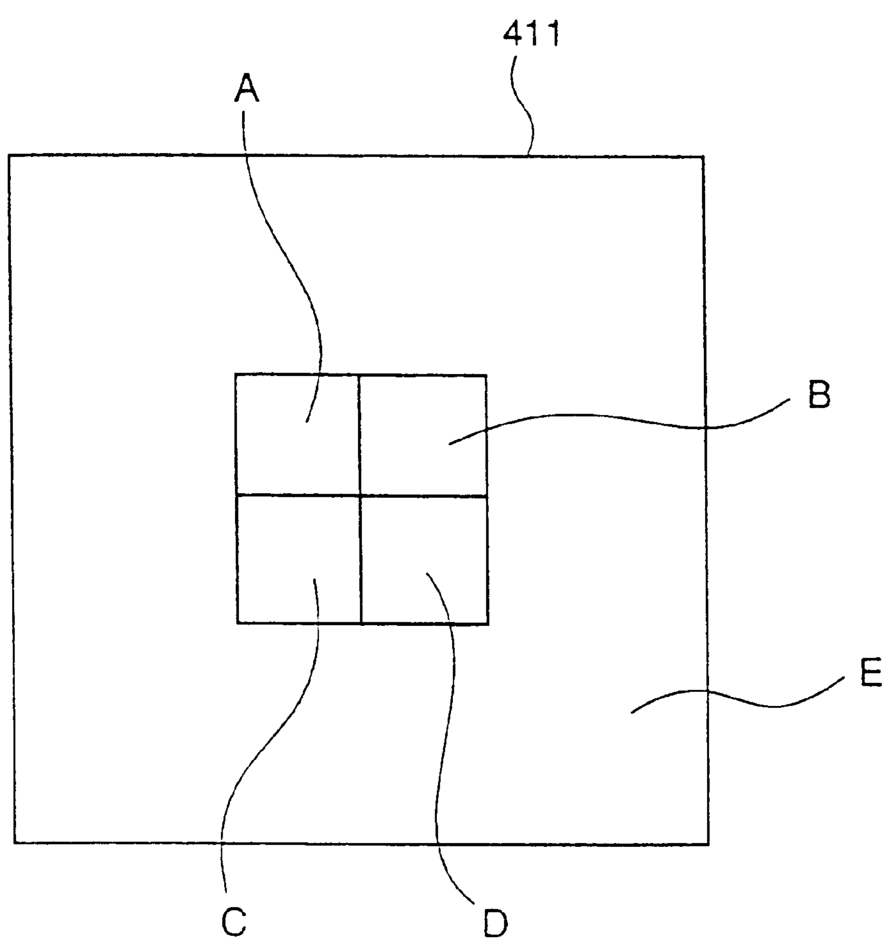
FIG. 11 is an schematic diagram illustrating a photodetector included in the apparatus according to the fourth embodiment of the invention.

The photodetector 411 has a light responsive surface divided into five parts. That is, a light responsive surface is added to the photodetector 111 according to the third embodiment. FIG. 11 is a schematic diagram showing the photodetector 411. As shown in FIG. 11, the photodetector 411 according to this fourth embodiment has five light responsive parts A, B, C, D, and E whereas the photodetector 111 according to the third embodiment has four light responsive parts A, B, C, and D. The light responsive parts A, B, C, and D constitute an inner region of the photodetector 411, and the inner region is about 200 $\mu$m along each side. The light responsive part E constitutes an outer region of the photodetector 411, and the outer region is about 2 mm along each side.

An output from the adder 148, i.e., a signal obtained by adding output signals from the light responsive parts A, B, C, and D, is called an AS1L signal hereinafter. Therefore, as in the third embodiment of the invention, an output from the differential amplifier 117 becomes an FE signal that shows an error between the focal point of the is light beam 150 and the information face of the disk 100. In addition, an output from the differential amplifier 125 becomes a TE signal that shows an error between the focal point of the light beam 150 and the track on the disk 100. An output from the light responsive part E is sent to the I/V converter 450. An output from the I/V converter 450 is sent to the adder 462 and the LPF 460. An output signal from the adder 462 is a signal obtained by adding output signals from all the light responsive parts of the photodetector 411, and this signal is called an ASL signal hereinafter. Likewise, an output signal from the LPF 451 is called an ASL signal, an output signal from the I/V converter 450 is called an AS2 signal, and an output signal form the LPF 460 is called an AS2L signal. The ASL signal is sent to the A/D converter 461. The microcomputer 447 receives an output from the A/D converter 461 and receives the AS2L signal through the A/D converter 452. The I/V converter 450 operates in the same way as the I/V converter 120. Likewise, the LPFs 451 and 460 and the A/D converters 461 and 452 operate in the same way as the LPF 165 and the A/D converter 142, respectively. The amplifier 453 can change the amplification factor in response to a command from the microcomputer 447. The adder 454 and the D/A converter 455 operate in the same way as the adder 132 and the D/A converter 141, respectively.

Figure 12:
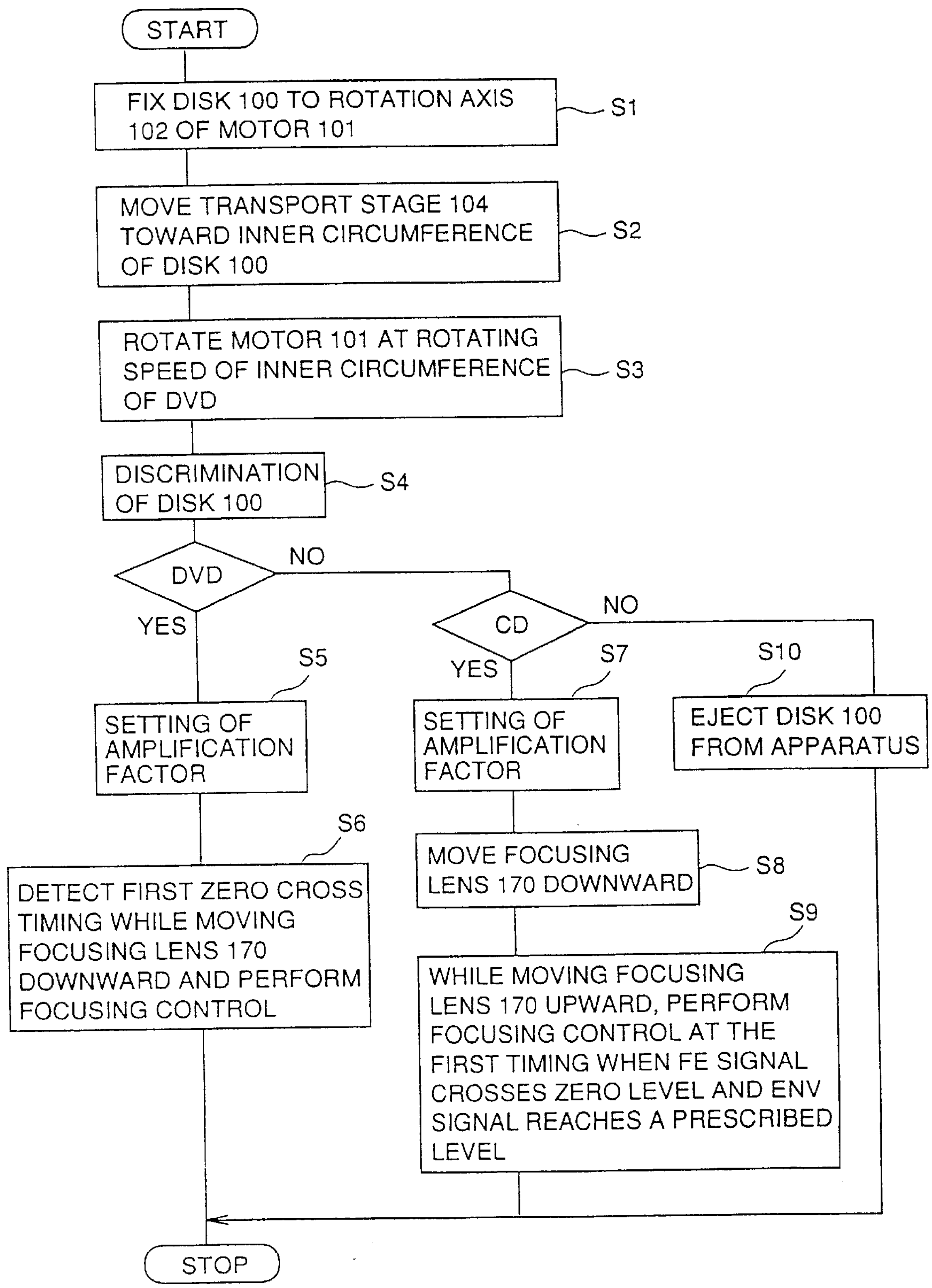
FIG. 12 is a flow chart for explaining the operation of the apparatus according to the fourth embodiment of the invention.

The operation of the optical disk apparatus shown in FIG. 10 will be described using a flow chart shown in FIG. 12.

When the disk 100 is put on the tray 149, the microcomputer 447 drives the motor 118 to set the disk 100 to the rotation axis 102 of the motor 101 (step S1).

Next, the microcomputer 447 drives the transport motor 103 through the D/A converter 145 and the power amplifier 139 to move the transport stage 104 toward the inner circumference of the disk 100 (step S2). Then, the microcomputer 447 rotates the motor 101 (step S3). The rotating speed of the motor 101 is set at a rotating speed normalized for reproduction of information on an inner circumference of a DVD.

Further, the microcomputer 447 discriminates the disk 100 to identify whether the disk 100 is a DVD, a CD, or a CD-R (step S4). A method of discriminating the disk will be described later. The system for the discrimination is constructed so that the position of the focusing lens 170 at the completion of the discriminating process is nearer to the disk 100 than the position of the focusing lens 170 when the focusing control is normally performed.

A description is given of the operation of the apparatus when the disk 100 is identified as a DVD.

The microcomputer 447 sets an amplification factor of the amplifier 453 on the basis of a value AS1Lp (p means "peak") that is measured in the discriminating process (step S5). Next, through the D/A converter 141, the adder 132, and the power amplifier 133, the microcomputer 447 moves the focusing lens 170 gradually downward. The FE signal detected during the downward movement of the lens 170 is amplified by the amplifier 453 and A/D converted by the A/D converter 140, and the timing when the FE signal crosses the zero level for the first time (hereinafter referred to as zero cross timing) is detected on the basis of an output from the A/D converter 140 (step S6). When the zero cross timing is detected, the output from the D/A converter 141 is made zero and the switch 131 is closed, thereby performing the focusing control (step S6). The AS1Lp signal will be described later.

A description is given of the operation of the apparatus when the disk 100 is identified as a CD.

As in the case of the DVD, the microcomputer 447 sets an amplification factor of the amplifier 453 on the basis of the value AS1L measured in the discriminating process (step 7). Further, the microcomputer 447 sets the rotating speed of the motor 101 at a rotating speed normalized for reproduction of information on an inner circumference of a CD.

Next, the focusing lens 170 is moved once downward (step S8) and then gradually upward, and the timing when the ENV signal output from the envelope detector 143 exceeds a prescribed level for the first time and the FE signal crosses the zero level for the first time is detected on the basis of the output from the A/D converter 140 (step S9). When the zero cross timing is detected, the output from the D/A converter 141 is made zero and the switch 131 is closed, thereby performing the focusing control (step S9).

The reason why the moving direction of the focusing lens 170 is changed between the CD and the DVD is as described for the third embodiment of the invention. Therefore, when a DVD is set in the apparatus, since the step of moving the focusing lens once downward is dispensed with, it is possible to start the signal reproduction within a short time, compared to the case where a CD is set in the apparatus. Therefore, when DVDs are frequently set in the apparatus as compared with CDs, the signal reproduction can be started within a short time on the average.

When the disk 100 is identified as a CD-R, the motor 118 is driven to move the tray 149 so that the disk 100 is ejected from the apparatus (step S10).

Next, a method of discriminating a disk using the microcomputer 447 will be described.

Figure 13:
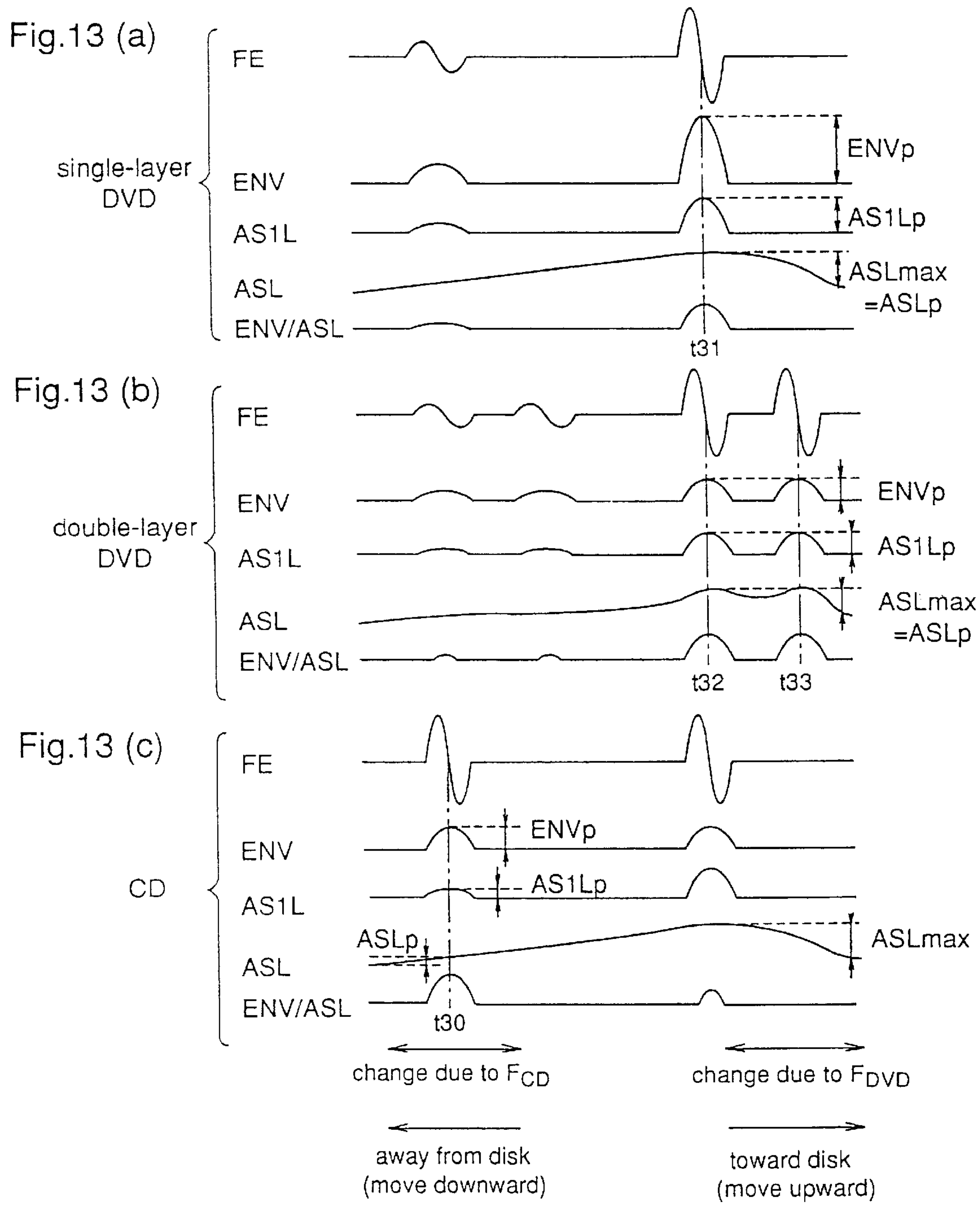
FIGS. 13(*a*)–13(*c*) are waveforms of FE signals, ENV signals, AS1L signals, ASL signals, and ENV/ASL values, in a single-layer DVD, a double-layer DVD, and a CD, respectively, according to the fourth embodiment of the invention.

FIGS. 13(*a*)–13(*c*) show levels of an FE signal, an ENV signal, an AS1L signal, and an ASL signal, and an ENV/ASL value which is obtained by dividing the ENV signal level by the AS1L signal level, for a single-layer DVD, a double-layer DVD, and a CD, respectively.

The ENV signal and the AS1L signal change due to the focal point $F_{CD}$ for the CD and the focal point $F_{DVD}$ for the DVD. In addition, the FE signal has a level change, generally called an S curve, when the focal point $F_{CD}$ ($F_{DVD}$) passes through the information face of the disk.

According to an experiment, in case of the DVD, ENV/ASL attains a maximum value when the focal point $F_{DVD}$ is on the information face. The reason is as follows. Since the ASL signal is a low frequency component of the light beam reflected by the disk, ENV/ASL shows the ratio of modulated amount of the light beam irradiating the disk by the pits on the disk. Therefore, when the focal point suitable for the disk set in the apparatus is on the information face of the disk, information recorded in the disk is reproduced with high efficiency. So, in case of the DVD, ENV/ASL attains a maximum value when the focal point $F_{DVD}$ is on the information face of the disk. In case of the single-layer DVD, ENV/ASL attains a maximum value at time t31 in the waveform shown in FIG. 13(*a*). In case of the double-layer DVD, at times t32 and t33 in the waveform shown in FIG. 13(*b*) where the focal point $F_{DVD}$ is on the first and second information faces of the disk, respectively, ENV/ASL attains a maximum value. In case of the CD, ENV/ASL attains a maximum value at time t30 in the waveform shown in FIG. 13(*c*) where the focal point $F_{CD}$ is on the information face of the disk.

Although in this fourth embodiment the ENV signal is obtained from the amount of light ASL received by the light responsive parts A, B, C, D, and E of the photodetector 411, the ENV signal may be obtained from the amount of light AS1L received by the light responsive parts A, B, C, and D. Further, although ENV is divided with ASL, AS1L may be used in place of ASL. In this case, under the condition where ENV/ASL attains a maximum value, a value of AS1L/AS2L, which is obtained by dividing the AS1L level by the AS2L level that is obtained by subtracting the AS1L level from the ASL level, is larger in the single-layer DVD than in the double-layer DVD and the CD. That is, in the single-layer DVD, the intensity of light beam in the center of the photodetector 411 is increased.

Figure 24:
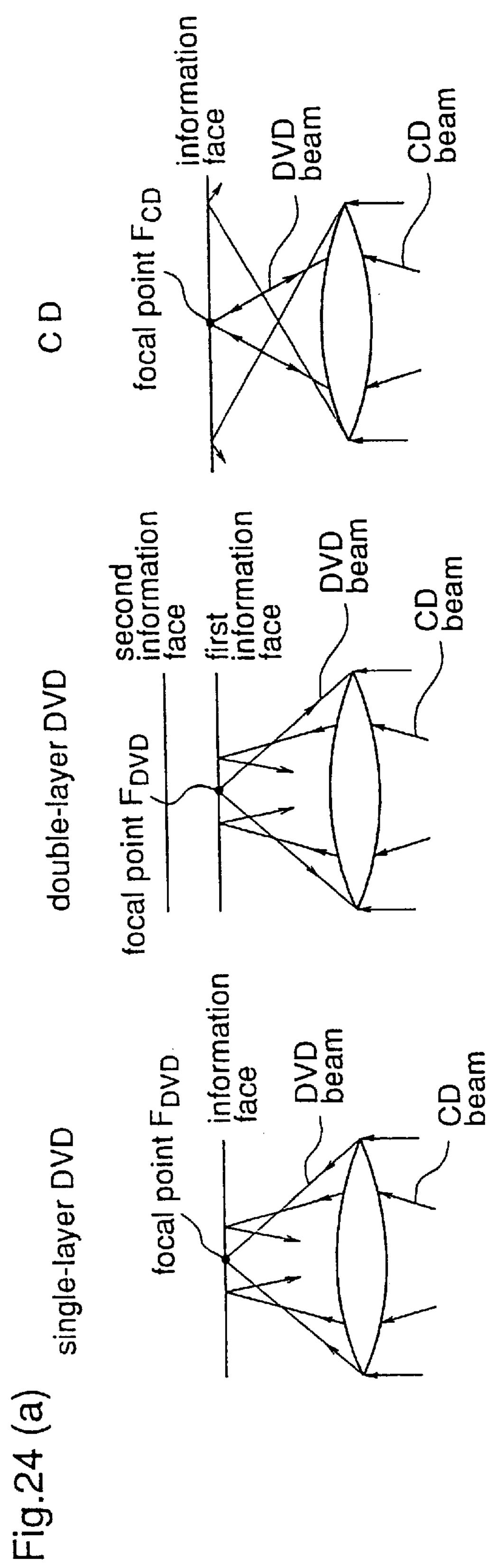
FIGS. 24(*a*) and 24(*b*) are diagrams illustrating positional relationship between information face and focal points $F_{DVD}$ and $F_{CD}$, and reflected beams from the information face to a photodetector, respectively, when ENV/ASL attains a maximum value, according to the fourth embodiment of the invention.
Figure 24:
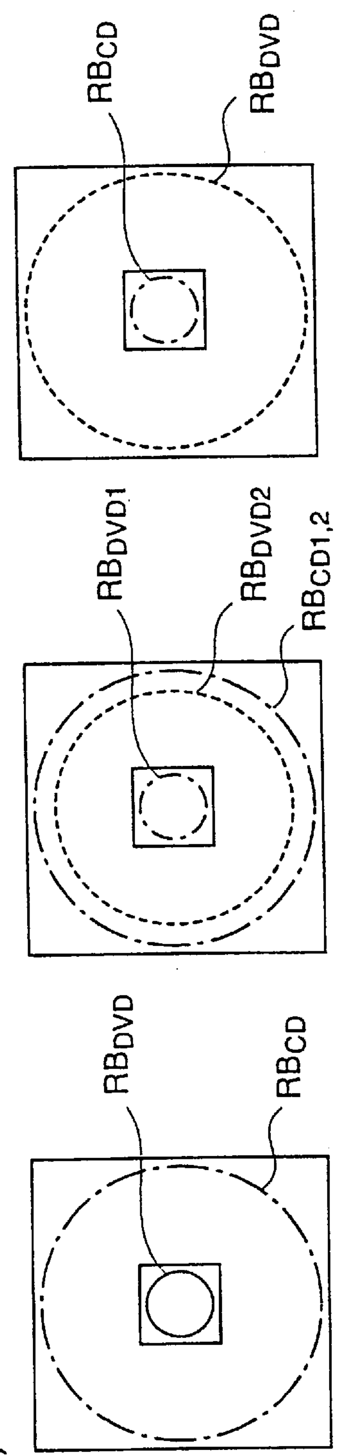
Figure 25:
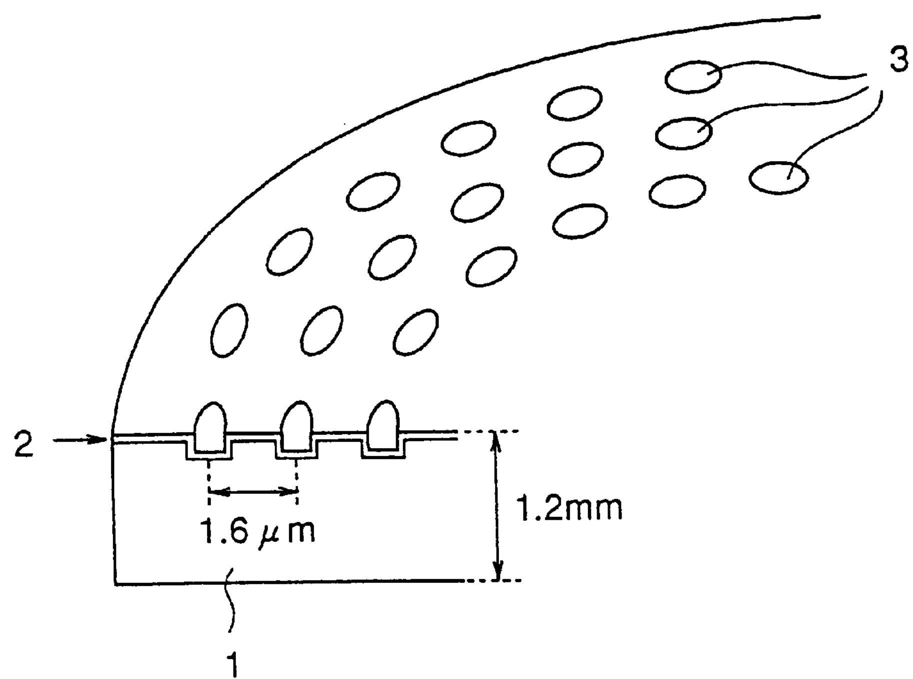
FIG. 25 is a schematic diagram illustrating a conventional CD.
Figure 26:
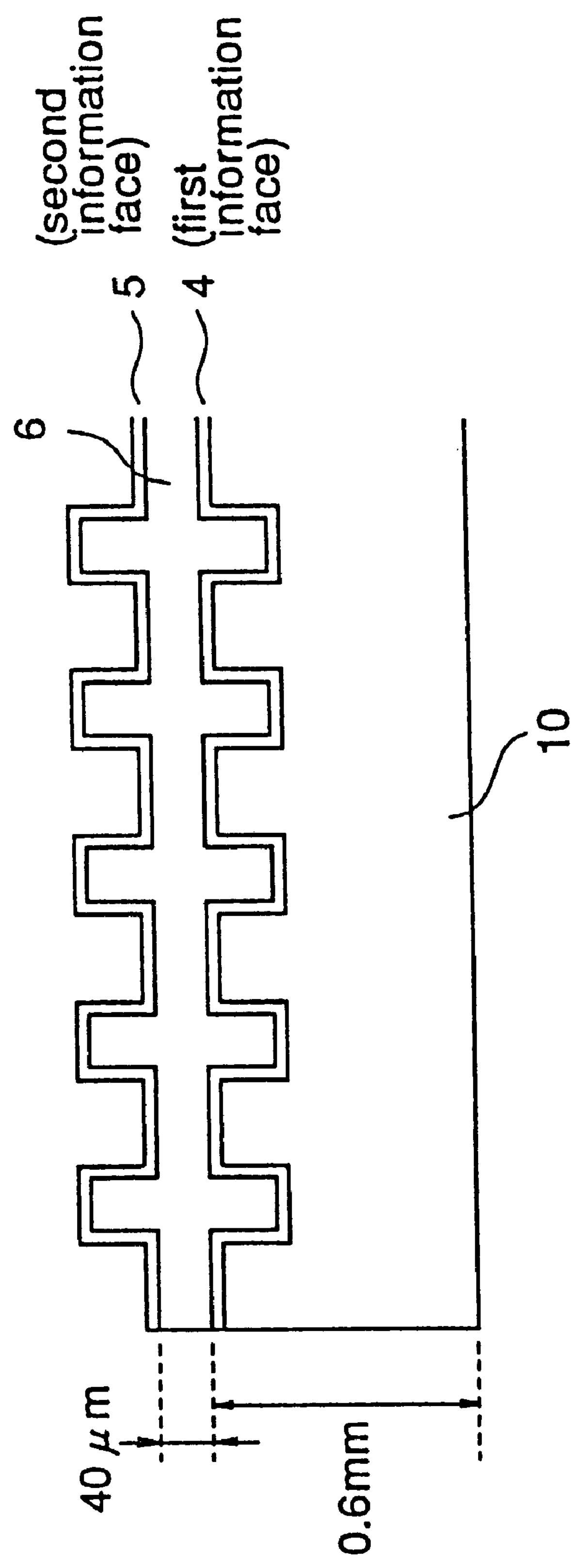
FIG. 26 is a schematic diagram illustrating a typical double-layer DVD.

The reason will be described using FIGS. 24(*a*) and 24(*b*). FIGS. 24(*a*) and 24(*b*) show conditions where ENV/ASL attains a maximum value for a single-layer DVD, a double-layer DVD, and a CD. More specifically, FIG. 24(*a*) shows the positional relationships between the information face of the disk 100 and the focal points $F_{DVD}$ and $F_{CD}$, and FIG. 24(*b*) shows reflected beams from the information face of the disk 100 to the photodetector 411.

Initially, the single-layer DVD will be described. In the single-layer DVD, ENV/ASL attains a maximum value when the focal point $F_{DVD}$ is on the information face. The reflected beam from the information face of the disk 100 is narrowed by the detection lens 113 and applied to the photodetector 411 through the cylindrical lens 116. Therefore, the reflected beam $RB_{DVD}$ of the beam for the DVD (hereinafter referred to as DVD beam) forms a focal point in the center of the photodetector 411. However, since the focal point $F_{CD}$ is not on the information face of the disk, the reflected beam $RB_{CD}$ of the beam for the CD (hereinafter referred to as CD beam) is incident on the entire surface of the photodetector 411 and irradiates the surface dimly.

Next, the double-layer DVD will be described. In the double-layer DVD, ENV/ASL attains a maximum value when the focal point $F_{DVD}$ is on the first information face or the second information face. In the figure, the focal point $F_{DVD}$ is on the first information face. AS1L/AS2L obtained when the focal point $F_{DVD}$ is on the first information face is approximately equal to AS1L/AS2L obtained when the focal point $F_{DVD}$ is on the second information face.

In the double-layer DVD, the reflected beam $RB_{DVD1}$ of the DVD beam from the first information face forms a focal point in the center of the photodetector 411. The DVD beam and the CD beam traveling through the first information face are reflected by the second information face to be a reflected beam $RB_{DVD2}$ and a reflected beam $RB_{CD}$, respectively, and are incident on the entire surface of the photodetector 411 because the focal point $F_{CD}$ of the CD beam and the focal point $F_{DVD}$ of the DVD beam passing through the first information face are not on the information face.

Since the reflectivity at the information face of the single-layer DVD is higher than the reflectivity at the information faces of the double-layer DVD, the amount of the inner side light beam incident on the photodetector 411 in the single-layer DVD (the reflected beam $RB_{DVD}$) is larger than the amount of the inner side light beam incident on the photodetector 411 in the double-layer DVD (the reflected beam $RB_{DVD1}$). In case of the double-layer DVD, the reflected beam $RB_{DVD2}$ of the DVD beam from the second information face is incident on the entire surface of the photodetector 411 and the reflected beam $RB_{CD1,2}$ of the CD beam from the first and second information faces is added to the reflected beam $RB_{DVD2}$. So, the amount of the outer side light beam incident on the photodetector 411 in the double-layer DVD is larger than the amount of the outer side light beam incident on the photodetector 411 in the single-layer DVD (the reflected beam $RB_{CD}$). Therefore, as described above, AS1L/AS2L is larger in the single-layer DVD than in the double-layer DVD.

Finally, the CD will be described. In the CD, ENV/ASL attains a maximum value when the focal point $F_{CD}$ is on the information face of the disk. Therefore, the reflected beam $RB_{CD}$ of the CD beam forms a focal point in the center of the photodetector 411. The reflected light $RB_{DVD}$ of the DVD beam is incident on the entire surface of the photodetector 411 because the focal point $F_{DVD}$ is not on the information face.

Since the intensity of the focal point $F_{DVD}$ is higher than the intensity of the focal point $F_{CD}$, the mount of the inner side light beam incident on the photodetector 411 in the single-layer DVD (the reflected beam $RB_{DVD}$) is larger than the amount of the inner side light beam incident on the photodetector 411 in the CD (the reflected beam $RB_{CD}$). In case of the CD, since the reflected beam $RB_{DVD}$ of the DVD beam is incident on the entire surface of the photodetector 411, the amount of the outer side light beam incident on the photodetector 411 is larger than the amount of the outer side light beam incident on the photodetector 411 in the single-layer DVD (the reflected beam $RB_{CD}$).

Therefore, as described above, AS1L/AS2L is larger in the single-layer DVD than in the CD.

According to the experiment, AS1L/AS2L in the single-layer DVD is about 1.5 times as large as those in the double-layer DVD and the CD. Further, the level ENVp of the ENV signal under the condition that ENV/ASL attains a maximum value is higher in the single-layer DVD than in the double-layer DVD and the CD. In case of a disk having a standard reflectivity, the maximum value $ASL_{max}$ of ASL is approximately the same in a single-layer DVD, a double-layer DVD, and a CD.

A description is now given of a method for discriminating a single-layer DVD.

While moving the focusing lens 170 in the direction perpendicular to the information face of the disk 100, ENV/ASL is calculated, and AS1Lp, AS2Lp, ASLp, and ENVp at the moment when the ENV/ASL attains a maximum value are stored. Meanwhile, the maximum value $ASL_{max}$ of ASL within the period of time during which the focusing lens 170 moves is measured. Using these values, a value Y is given by $$Y=(ENVp/ASL_{max})\times AS1Lp/AS2Lp$$

The value Y is significantly larger in the single-layer DVD than in the double-layer DVD and the CD. According to the experiment, the value Y in the single-layer DVD is about four times as large as those in the double-layer DVD and the CD. Therefore, a value F intermediate the value Y in the [si]ngle-layer DVD and the value Y in the double-layer DVD or the CD is calculated in advance, and this value F is compared with the value Y, whereby it is identified whether the disk 100 is a single-layer DVD or not. Since $ASL_{max}$ is used, the value Y is not adversely affected by variations in the reflectivity of the disk.

Although in this fourth embodiment the discrimination is performed using the value Y, a value Y2 obtained in the following formula may be employed for the discrimination in place of the value Y.

$$Y2=AS1Lp/AS2Lp$$

Further, when the variation in the reflectivity of the disk is small, a value Y3 obtained in the following formula may be employed for the discrimination.

$$Y3=ENVp\times AS1Lp/AS2Lp$$

The optical disk apparatus according to this fourth embodiment can reproduce a single-layer DVD, a double-layer DVD, and a CD. However, in an apparatus for reproducing two disks, a single-layer DVD and a CD, it is possible to discriminate between the single-layer DVD and the CD using the value Y. That is, discrimination between a disk having a thin base substrate and a disk having a thick base substrate is possible.

Hereinafter, a method of discriminating between a double-layer DVD and a CD will be described.

While moving the focusing lens 170 in the direction perpendicular to the information face of the disk 100, ENV/ASL is calculated, and AS1Lp at the moment when the ENV/ASL attains a maximum value is measured. Meanwhile, the maximum value $ASL_{max}$ of ASL within the period of time during which the focusing lens 170 moves is measured. Using these values, a value Z is give by $$Z=ASLp/ASL_{max}$$

The value Z is larger in the double-layer DVD than in the CD. The reason is as follows. In the double-layer DVD, when the focal point $F_{DVD}$ is on the first information face, the light beam traveling through the first information face is reflected by the second information face, and most of the reflected light is incident on the photodetector 411 because the distance between the first information face and the second information face is as short as about 40 $\mu$m. The same may be said when the focal point $F_{DVD}$ is on the second information face.

Further, in the CD, when the focal point $F_{DVD}$ is on the information face, the light beam forming the focal point $F_{DVD}$ is reflected at the information face, and most of the reflected light is incident on the photodetector 411. Under this condition, ASL attains a maximum value because the amount of light at the focal point $F_{DVD}$ is larger than the amount of light at the focal point $F_{CD}$. Further, when the focal point $F_{CD}$ is on the information face, the light beam forming the focal point $F_{DVD}$ is reflected at the information face and becomes a stray light, a part of which is not incident on the photodetector 411, because the distance between the focal point $F_{CD}$ and the focal point $F_{DVD}$ is as long as about 300 $\mu$m. Therefore, the ASL level is reduced as compared with the case where the focal point $F_{DVD}$ is on the information face.

According to the experiment, the value Z is about 1 in the double-layer DVD and about 0.5 in the CD. Therefore, when a value G intermediate the value Z in the double-layer DVD and the value Z in the CD is calculated in advance and this value G is compared with the value Z, discrimination between a double-layer DVD and a CD is possible.

However, in the single-layer DVD, since the amount of light at the focal point $F_{DVD}$ is larger than the amount of light at the focal point $F_{CD}$, even when a part the reflected light of the light beam forming the focal point $F_{CD}$ is not incident on the photodetector 411, ASLp is not adversely affected. Therefore, the value Z is approximately 1. Although in this fourth embodiment discrimination between a double-layer DVD and a CD is performed using the value Z, discrimination between a single-layer DVD and a CD is also possible. That is, discrimination between a disk having a thick base substrate and a disk having a thin base substrate is possible using the value Z.

Figure 14:
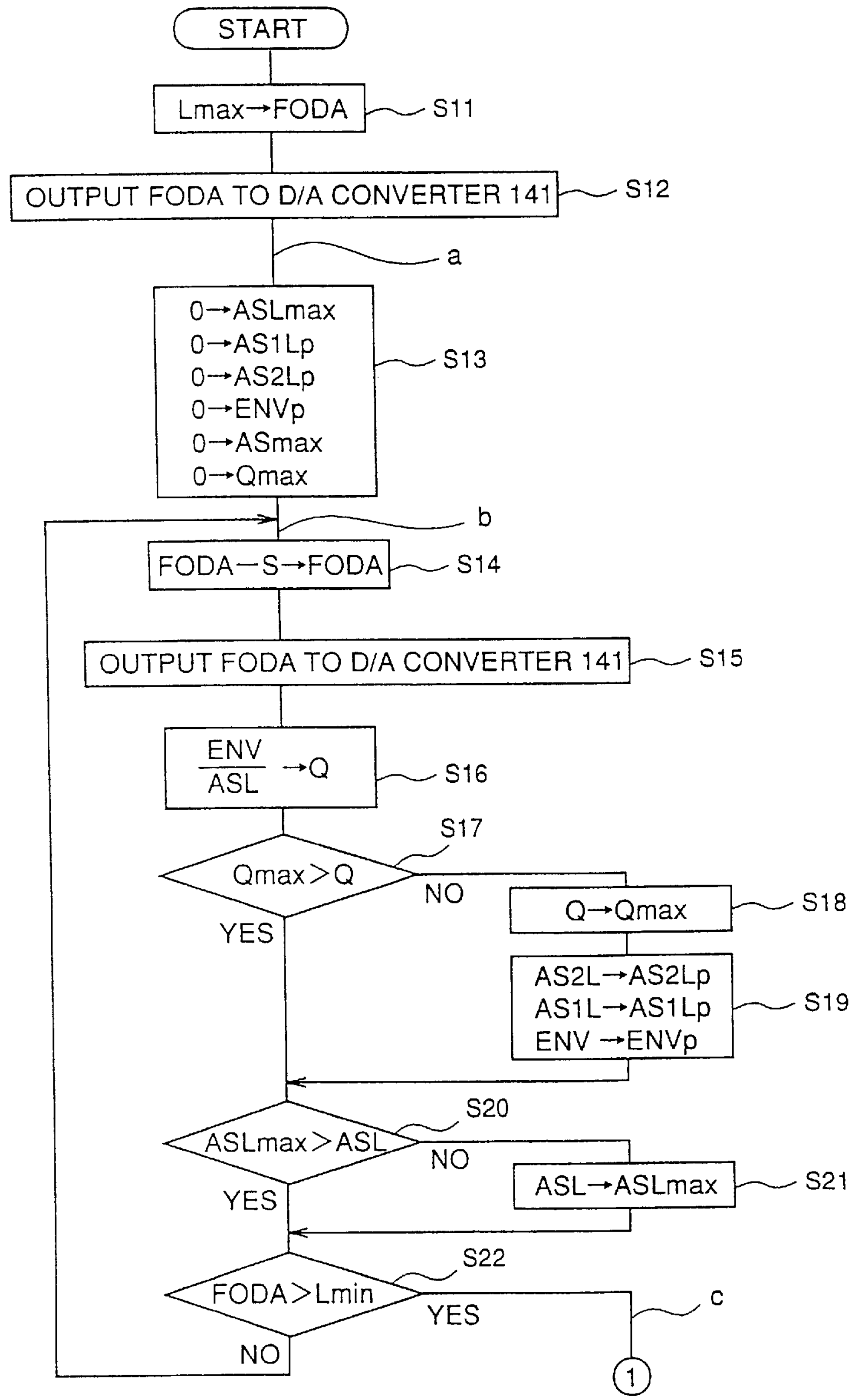
FIG. 14 is a flow chart for explaining a disk discriminating process according to the fourth embodiment of the invention.
Figure 15:
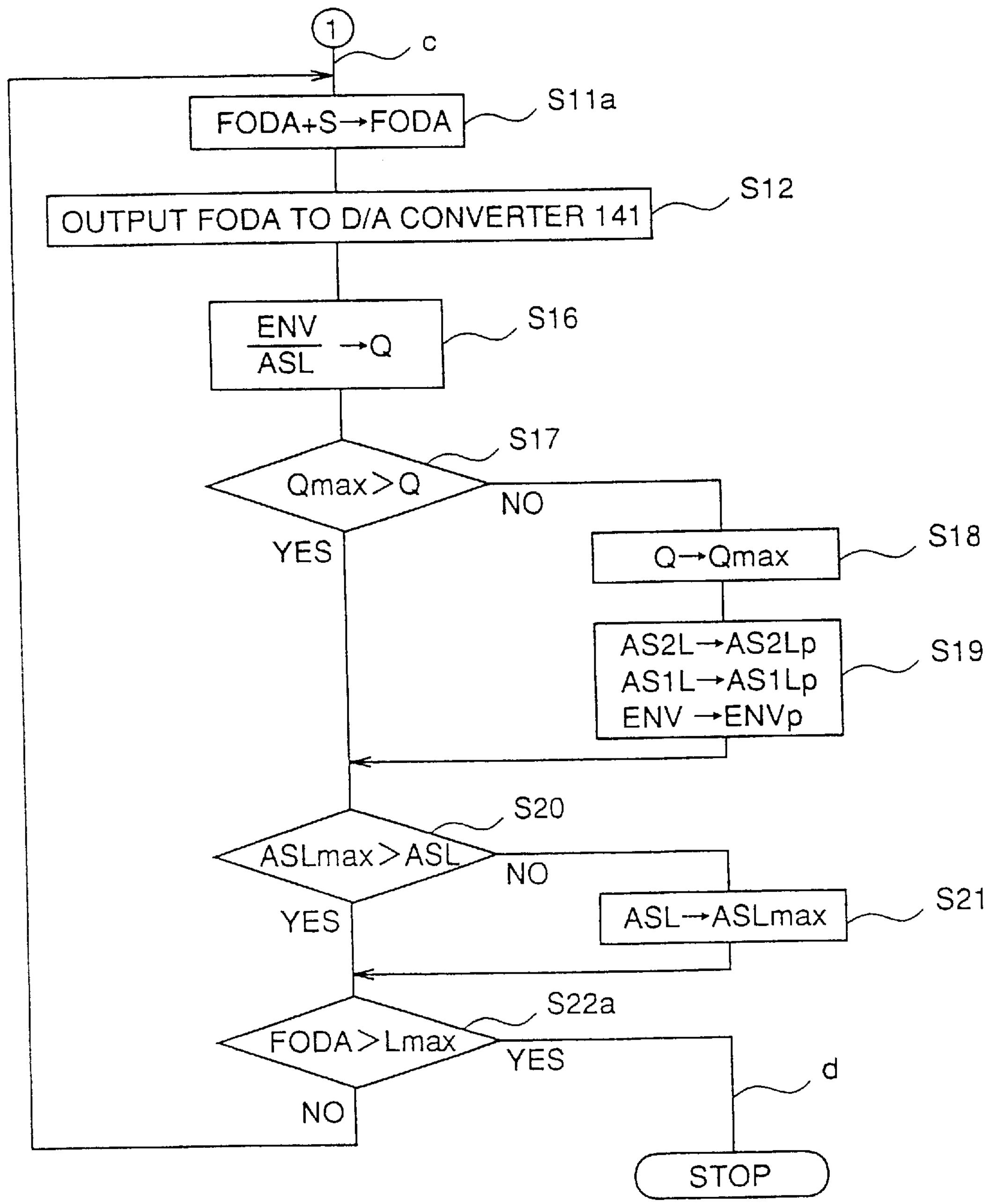
FIG. 15 is a flow chart for explaining a disk discriminating process according to the fourth embodiment of the invention.

The operation of the microcomputer 447 in the above-mentioned discriminating process will be described using a flow chart shown in FIGS. 14 and 15.

The microcomputer 447 substitutes $L_{max}$ for a variable FODA (step S11) and sets a value of the variable FODA in the D/A converter 141 (step S12), whereby the focusing lens 170 moves upward. Here, $L_{max}$ satisfies that both the focal point $F_{CD}$ and the focal point $F_{DVD}$ are positioned above the information surface of the disk. This point in the flow chart is denoted as point a. Thereafter, the respective variables, AS1Lp, AS2Lp, ASLp, ENVp, $ASL_{max}$, and $Q_{max}$ are cleared (step S13). This point in the flow chart is denoted as point b. After point b, a value obtained by subtracting S from the variable FODA is substituted for the variable FODA (step S14). Then, the variable FODA is set in the D/A converter (step S15). Here, S is much smaller than $L_{max}$ and a positive value. Therefore, an output value from the D/A converter 141 becomes small and is transmitted through the adder 132 and the power amplifier 133 to the focusing lens 170, whereby the focusing lens 170 moves slightly downward. In this state, the microcomputer 447 calculates ENV/ASL and substitutes this value for the variable Q (step S18). Then, the microcomputer 447 substitutes AS2L, AS1L, and ENV for the variables AS2Lp, AS1Lp, and ENVp, respectively (step S19). Thereafter, the microcomputer 447 compares the variable $ASL_{max}$ with ASL (step S20). When the variable $ASL_{max}$ is smaller than ASL, the microcomputer 447 substitutes ASL for the variable $ASL_{max}$ (step S21).

Next, when the variable FODA is larger than $L_{min}$ (NO in step S22), the processing returns to point b. When the variable FODA is smaller than $L_{min}$ (YES in step S22), the operation proceeds to the next step. This point in the flow chart is denoted as point c. Here, $L_{min}$ satisfies that both the focal point $F_{CD}$ and the focal point $F_{DVD}$ are positioned below the information face of the disk.

During the processing from point a to point c, the focal point $F_{CD}$ and the focal point $F_{DVD}$ pass through the information face of the disk once. The processing after point c is shown in FIG. 15.

The processing from point c to point d is similar to the processing from point b to point c mentioned above except that a value obtained by adding S to the variable FODA is substituted for the variable FODA (step S11*a*), step S12 is followed by step S16, and the processing is concluded when the variable FODA becomes larger than $L_{max}$ (YES in step S22*a*). During the processing from point c to point d, the focal point $F_{CD}$ and the focal point $F_{DVD}$ pass through the information face of the disk once. Therefore, during the processing from point a to point d, the focal point $F_{CD}$ and the focal point $F_{DVD}$ pass through the information face of the disk twice. Thereby, the moment when ENV/ASL attains a maximum value is detected accurately. Further, during the processing from point b to point d, the microcomputer 447 outputs a sine wave through the D/A converter 455 toward the adder 454, and the sine wave is applied to the focusing lens 170 through the phase compensator 135 and the power amplifier 136, whereby the focusing lens 170 vibrates in the direction perpendicular to the track on the disk. Since the vibration of the focusing lens 170 prevents the focal point from being always positioned between the tracks, the information recorded on the tracks is easily reproduced, and an accurate level of the ENV signal is measured.

Figure 16:
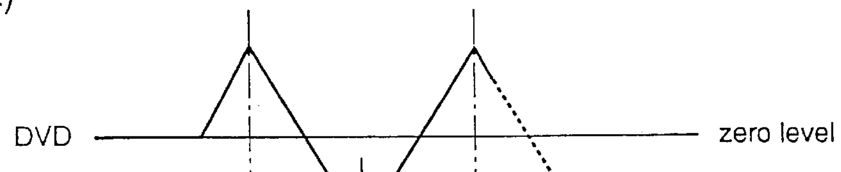
FIGS. 16(*a*) and 16(*b*) are waveforms for explaining a movement of a focusing lens for a DVD and a CD, respectively, according to the fourth embodiment of the invention.
Figure 16:
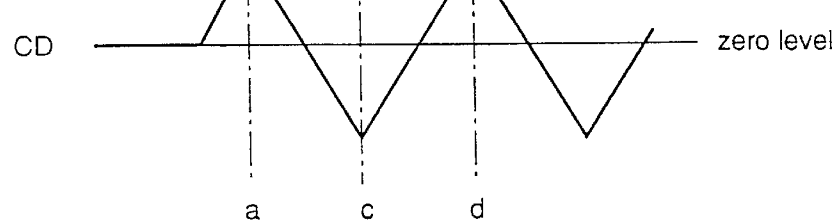

FIGS. 16(*a*) and 16(*b*) show variations in the position of the focusing lens 170 during the discrimination of the disk according to the above-mentioned operation. In the figures, the abscissa shows time, and the ordinate shows the position of the lens 170. The upward direction of the ordinate means that the lens 170 approaches the disk 100. The points a, c, and d shown in FIGS. 14 and 15 correspond to points a, c, and d shown in FIG. 16. When the discrimination is concluded, the focusing lens 170 is positioned above. When the disk 100 is a DVD, while moving the focusing lens 170 gradually downward, the first zero cross point of the FE signal is detected to perform the focusing control. When the disk 100 is a CD, the focusing lens 170 is moved once downward and then gradually upward and, during the upward movement of the lens 170, the first zero cross point of the FE signal is detected to perform the focusing control.

Therefore, when a DVD is set in the apparatus, reproduction of signals can be started within a short time, compared to the case where a CD is set in the apparatus.

Next, a description is given of setting an amplification factor of the amplifier 453 on the basis of AS1Lp. The setting of the amplification factor is performed to secure an accurate detection of the timing for performing the focusing control. Initially, the timing for performing the focusing control will be described with reference to FIG. 17.

Figure 17:
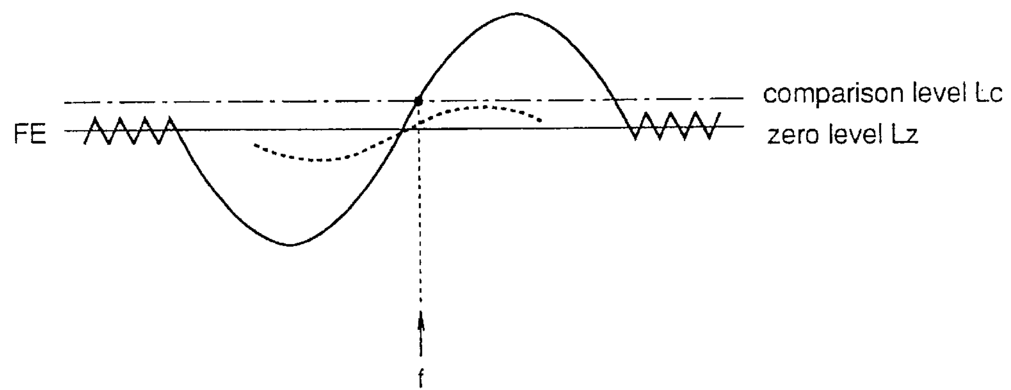
FIG. 17 is a waveform of an FE signal for explaining the operation of an amplifier according to the fourth embodiment of the invention.

FIG. 17 shows an FE signal in a single-layer DVD. The abscissa shows time. As the focusing lens 170 moves downward, the focal point $F_{DVD}$ approaches the information face of the disk. The FE signal is negative at first. When the focal point $F_{DVD}$ reaches the information face, the FE signal becomes zero and, thereafter, it becomes positive. The timing for performing the focusing control is shown by point f at which the focal point $F_{DVD}$ is on the information face. At point f, it is detected that the FE signal exceeds the comparison level Lc. In order to reduce the delay in the detection, the comparison level Lc must be near the zero level Lz. However, since the FE signal includes noise and the like, it is impossible to make the comparison level Lc zero. Therefore, the comparison level Lc is not the zero level Lz.

By the way, the amplitude of the FE signal decreases with a reduction in the reflectivity at the information face of the disk or a reduction in the intensity of the light beam 150. Even though the comparison level Lc is fixed, when the amplitude of the FE signal decreases, the delay in the detection increases. In the worst case, the amplitude of the FE signal does not reach the comparison level Lc. In the figure, the FE signal with reduced amplitude is shown by the dotted line. In this case, the timing for performing the focusing control cannot be detected, so that the focusing control cannot be performed.

The variation in the reflectivity of the information face of the disk or the intensity of the light beam 150 appears as a level change of the AS1Lp signal when the focal point is on the information face. That is, the level of the AS1Lp signal reduces with a reduction in the reflectivity of the information face of the disk. So, when the amplification factor of the amplifier 453 is set according to the level of the AS1Lp signal when the focal point for the disk set in the apparatus, i.e., $F_{DVD}$ or $F_{CD}$, is on the information face, an FE signal with a constant amplitude can be obtained even through the reflectivity of the information face varies. As a result, the timing for performing the focusing control can be detected accurately and reliability without a reduction in the amplitude of the FE signal as shown by the dotted line in FIG. 17.

Now, an amplitude of the FE signal and a value of AS1Lp in a standard condition are represented by H and J, respectively. Since AS1Lp is proportional to the amplitude of the FE signal, when the amplitude of the FE signal is reduced to H/2, AS1Lp is reduced to J/2. Since AS1Lp is J/2, i.e., 50% of that in the standard condition, the microcomputer 447 doubles the amplification factor of the amplifier 453. Thereby, the amplitude of the FE signal input to the A/D converter 140 becomes H, i.e., the amplitude in the standard condition. As a result, the timing for performing the focusing control can be detected with high reliability.

According to this fourth embodiment of the invention, in case of the DVD, ENV/ASL attains a maximum value when the focal point $F_{DVD}$ is on the information face (single-layer DVD) or when the focal point $F_{DVD}$ is on the first information face or the second information face (double-layer DVD). In case of the CD, ENV/ASL attains a maximum value when the focal point $F_{CD}$ is on the information face. According to the experiment, ENV/AS1L and ENV/ASL show similar characteristics, so that ENV/AS1L may be used in place of ENV/ASL. Further, although the ENV signal is detected from the AS signal, it may be detected from the AS1 signal.

Figure 18:
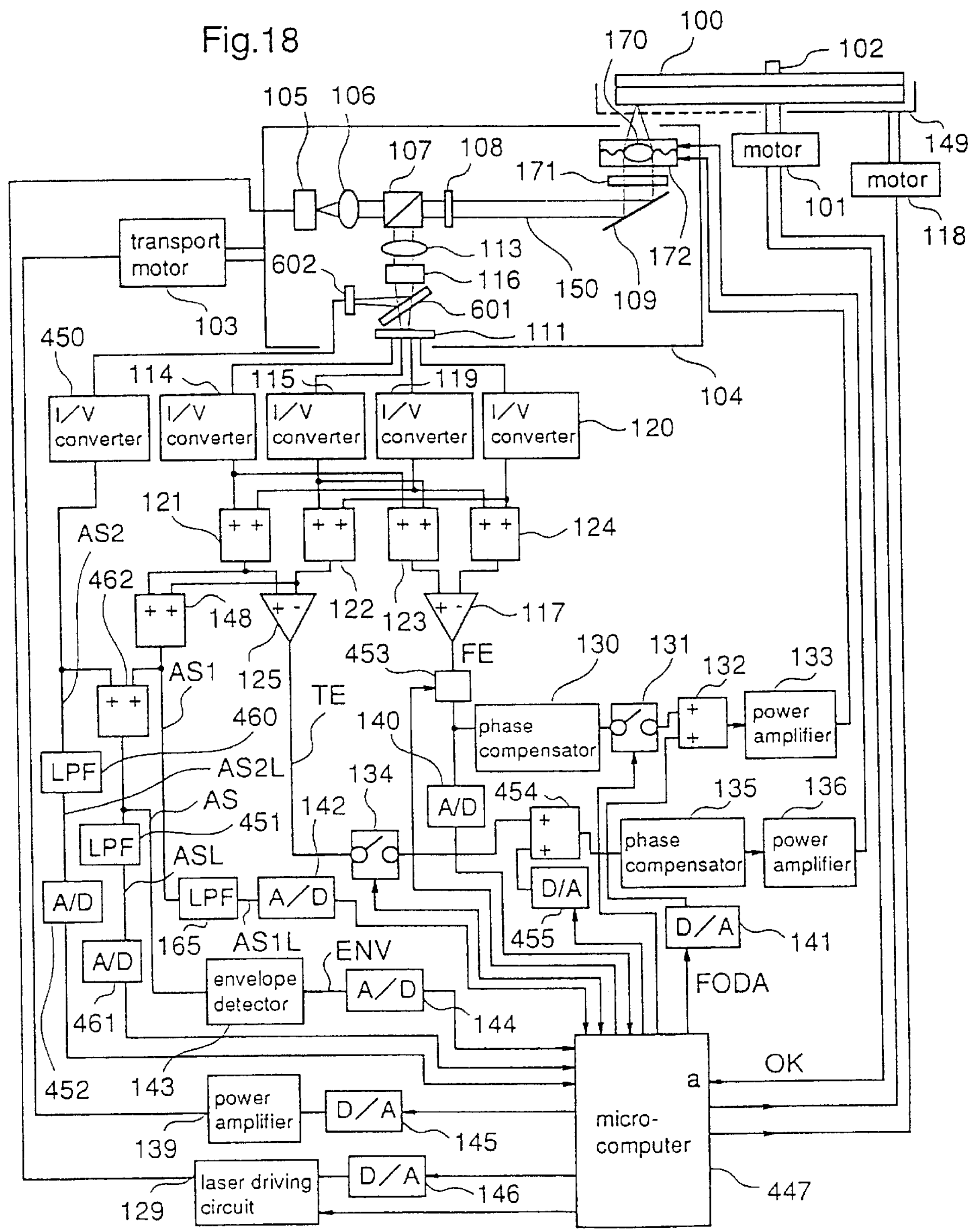
FIG. 18 is a block diagram illustrating an optical disk apparatus employing two photodetectors, according to a modification of the fourth embodiment of the invention.

While in this fourth embodiment of the invention a single photodetector 411 having a light responsive surface divided into five parts is employed, two photodetectors may be employed when the structure of the optical system is changed. FIG. 18 is a block diagram illustrating an optical disk apparatus including two photodetectors. In the figure, the same reference numerals as those shown in FIG. 10 designate the same or corresponding parts. Reference numeral 111 designates a photodetector, numeral 601 designates a half mirror, and numeral 602 designates a photodetector. The photodetectors Ill and 602 and the half mirror 601 are fixed onto the transport stage 104.

Figure 19:
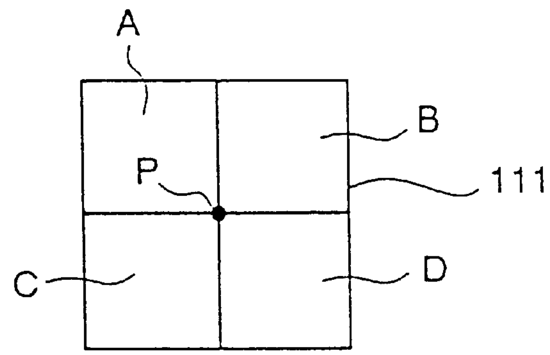
FIGS. 19(*a*) and 19(*b*) are schematic diagrams illustrating the photodetectors shown in FIG. 18.
Figure 19:
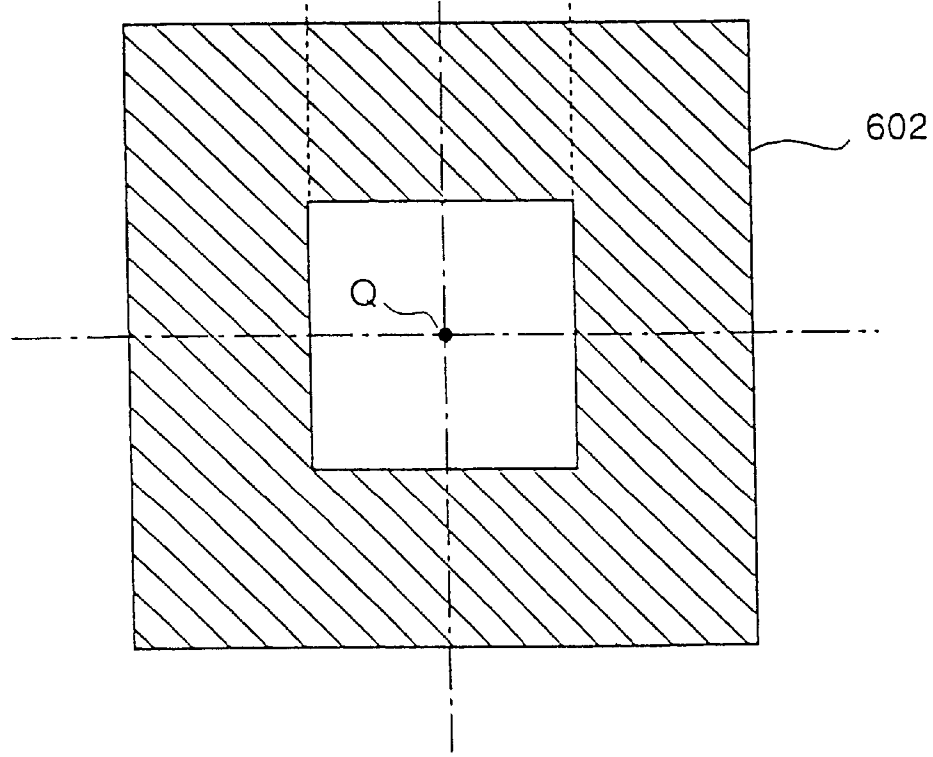

FIG. 19(*a*) and 19(*b*) are schematic diagrams illustrating the photodetector 111 and the photodetector 602, respectively. As shown in these figures, the photodetector 111 has four light responsive parts A, B, C, and D corresponding to the light responsive parts A, B, C, and D of the photodetector 411 shown in FIG. 11, and the photodetector 602 has a light responsive part (hatched part) corresponding to the light responsive part E of the photodetector 411. These photodetectors 111 and 602 are fixed so that the center points P and Q are aligned with the optical axis of incident light.

The light beam traveling through the cylindrical lens 116 is divided into two beams by the half mirror 601, and one of the beams is incident on the photodetector 111 while the other is incident on the photodetector 602. The photodetector 602 is positioned so that the distance from the half mirror 601 to the photodetector 602 is equal to the distance from the half mirror 601 to the photodetector 111. Therefore, input signals to the I/V converters 114, 115, 119, 120, and 450 are similar to those in the apparatus shown in FIG. 10. Therefore, the operation of the apparatus shown in FIG. 18 is similar to the operation of the apparatus shown in FIG. 10.

As described above, according to the fourth embodiment of the present invention, in an optical disk apparatus using an optical head having two focal points, i.e., a focal point for reproducing a disk having a thick base substrate and a focal point for reproducing a disk having a thin base substrate, the photodetector 411 detects the intensity of the reflected light in the center region and the intensity of the reflected light in the peripheral region. Therefore, it is possible to discriminate between a DVD having a thin base substrate and a CD having a thick base substrate on the basis of the intensity ratio.

Further, since the amount of light incident on the photodetector 411 when the ENV signal attains a maximum value is used for the discrimination of the disk 100, the discrimination is accurately performed.

Likewise, since the amount of light incident on the photodetector 411 when a value obtained by dividing the ENV signal by the ASL signal attains a maximum value is used for the discrimination of the disk 100, the discrimination is accurately performed even when the reflectivity of the disk 100 varies.

Furthermore, the amount of light AS1Lp incident on the first light responsive region of the photodetector 411, the amount of light AS2Lp incident on the second light responsive region of the photodetector 411, and the amplitude ENVp of the information signal are measured, and the ratio of AS1Lp×ENVp to AS2Lp is used for the discrimination of the disk 100, whereby the accuracy of the discrimination is improved.

Furthermore, the amount of light AS1Lp incident on the first light responsive region of the photodetector 411, the amount of light AS2Lp incident on the second light responsive region of the photodetector 411, the amplitude ENVp of the information signal, and $ASL_{max}$ are measured, and the ratio of AS1Lp×ENVp to AS2Lp×$ASL_{max}$ is used for the discrimination of the disk 100, the discrimination is accurately performed even when the reflectivity of the disk 100 varies.

The same effects as mentioned above are attained in the optical disk apparatus shown in FIG. 18 including the two photodetectors 111 and 602.

Furthermore, according to the fourth embodiment of the present invention, in an optical disk apparatus using an optical head having two focal points, i.e., a focal point for reproducing a disk having a thick base substrate and a focal point for reproducing a disk having a thin base substrate, the photodetector 411 detects the intensity of the reflected light in the center region and the intensity of the reflected light in the peripheral region. Therefore, it is possible to discriminate between a disk having a single information face and a disk having two information faces on the basis of the intensity ratio.

Further, since the amount of light incident on the photodetector 411 when the ENV signal attains a maximum value is used for the discrimination of the disk 100, the discrimination is accurately performed.

Likewise, since the amount of light incident on the photodetector 411 when a value obtained by dividing the ENV signal by the ASL signal attains a maximum value is used for the discrimination of the disk 100, the discrimination is accurately performed even when the reflectivity of the disk 100 varies.

Furthermore, the amount of light AS1Lp incident on the first light responsive region of the photodetector 411, the amount of light AS2Lp incident on the second light responsive region of the photodetector 411, and the amplitude ENVp of the information signal are measured, and the ratio of AS1Lp×ENVp to AS2Lp is used for the discrimination of the disk 100, whereby the accuracy of the discrimination is improved.

Furthermore, the amount of light AS1Lp incident on the first light responsive region of the photodetector 411, the amount of light AS2Lp incident on the second light responsive region of the photodetector 411, the amplitude ENVp of the information signal, and $ASL_{max}$ are measured, and the ratio of AS1Lp×ENVp to AS2Lp×$ASL_{max}$ is used for the discrimination of the disk 100, the discrimination is accurately performed even when the reflectivity of the disk 100 varies.

The same effects as mentioned above are attained in the optical disk apparatus shown in FIG. 18 including the two photodetectors 111 and 602.

Furthermore, according to the fourth embodiment of the present invention, in an optical disk apparatus using an optical head having two focal points, i.e., a focal point for reproducing a disk having a thick base substrate and a focal point for reproducing a disk having a thin base substrate, when it is detected from the output of the photodetector 411 that a focal point appropriate for the disk 100 set in the apparatus is present in the vicinity of the information face, the amplification factor of the variable amplifier 453 that amplifies the focal point error signal is changed according to the amount of light AS1Lp. Therefore, even when the reflectivity of the disk 100 varies, the amplitude of the FE signal is constant, whereby an accurate timing for performing the focusing control is obtained.

Further, after changing the amplification factor of the amplifier 453, focusing control is performed at the timing when the output signal from the amplifier 453 reaches a prescribed level. Therefore, it is avoided that the focusing control is performed at a wrong timing due to noise or the like.

Furthermore, since the amount of light incident on the photodetector 411 when a value obtained by dividing the ENV signal by the ASL signal attains a maximum value is used for the timing detection, even when the reflectivity of the disk 100 varies, the presence of the appropriate focal point in the vicinity of the information face can be detected at accurate timing.

Furthermore, since each of the two focal points, i.e., the focal point for reproducing a disk having a thick base substrate and the focal point for reproducing a disk having a thin base substrate, passes through the information face twice, the amount of reflected light from the disk 100 is accurately detected.

[Embodiment 5]

Figure 20:
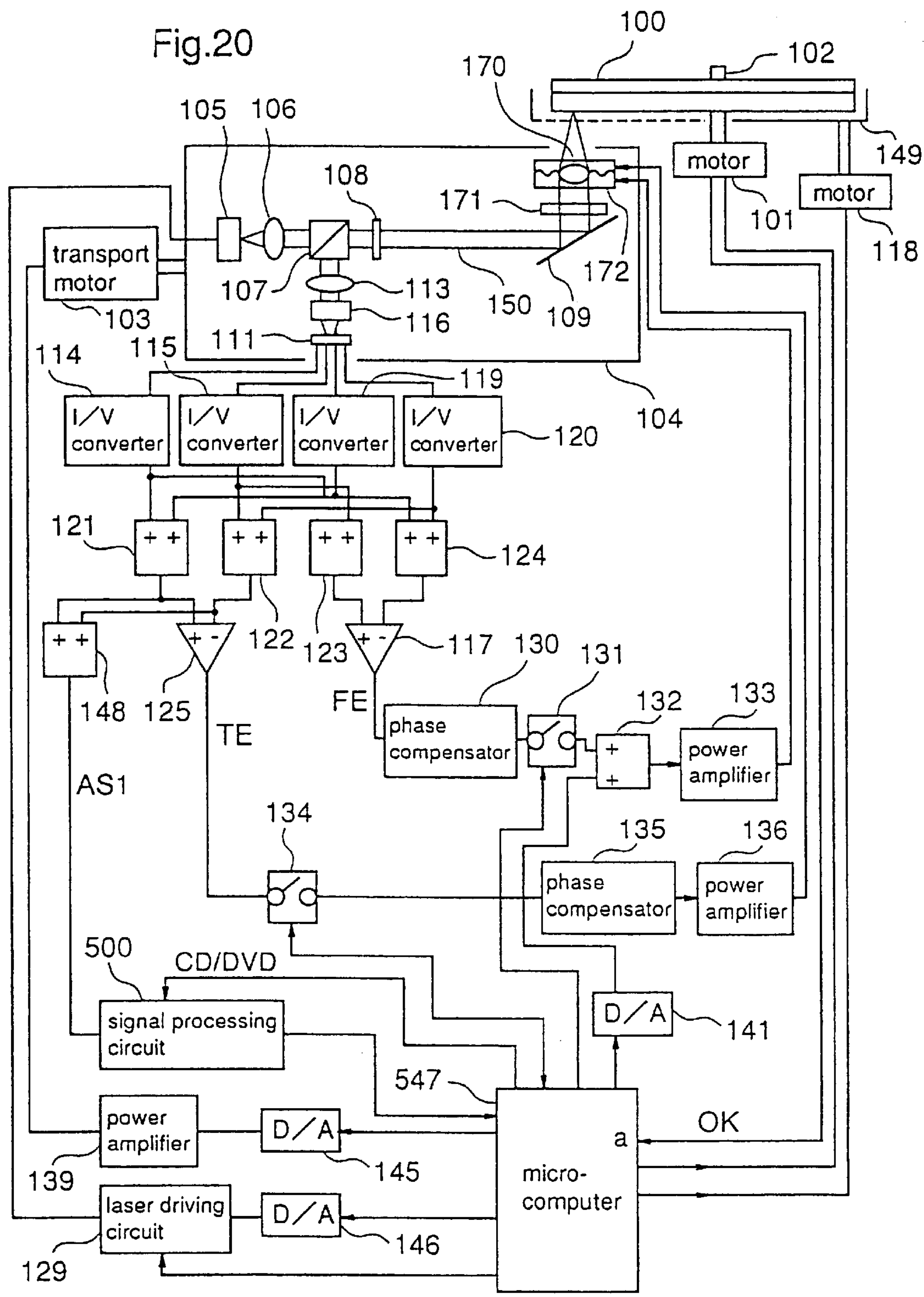
FIG. 20 is a block diagram illustrating an optical disk apparatus in accordance with a fifth embodiment of the present invention.

FIG. 20 is a block diagram illustrating an optical disk apparatus in accordance with a fifth embodiment of the present invention. In the figure, the same reference numerals as those shown in FIG. 6 designate the same or corresponding parts. Reference numeral 500 designates a signal processing circuit, and numeral 547 designates a microcomputer.

The signal processing circuit 500 reproduces information recorded in the disk 100 according to an output signal AS1 from the adder 148, converts the information to digital data, and sends the digital data to the microcomputer 547. The signal processing circuit 500 can reproduce both the CD and the DVD. The switching of the operation is commanded by the microcomputer 547.

The operation of the apparatus shown in FIG. 20 will be described using waveforms shown in FIGS. 21(*a*) and 21(*b*). The waveform in FIG. 21(*a*) shows the position of the focusing lens 170, and the waveform in FIG. 21(*b*) shows the FE signal as an output signal from the differential amplifier 117.

In FIG. 20, when the disk 100 is put on the tray 149, the microcomputer 547 drives the motor 118 so that the disk 100 is fixed to the rotation axis 102 of the motor 101. Next, the microcomputer 547 rotates the motor 101. The rotating speed of the motor 101 is set at a rotating speed of an inner circumference of a CD. The microcomputer 547 sets a value in the D/A converter 141 to move the focusing lens 170 once downward (t210 in FIG. 21(*a*)). Thereafter, the microcomputer 547 moves the focusing lens 170 gradually upward. At this time, the switches 131 and 134 are open. Since an output signal from the D/A converter 141 is sent through the adder 132 and the power amplifier 133 to the actuator 172, the level of the output signal from the D/A converter 141 corresponds to the position of the focusing lens 170.

While moving the focusing lens 170 gradually upward, the switch 131 is closed at the timing when the ENV signal exceeds a prescribed value and the FE signal crosses the zero level for the first time, thereby performing the focusing control. This timing is denoted by t211 in FIG. 21(*b*). As already described for the third embodiment of the invention, when the disk 100 is a CD, this timing for performing the focusing control is the timing when the focal point $F_{CD}$ is on the information face of the disk. Therefore, the focusing control is performed so that the focal point $F_{CD}$ is on the information face of the CD. Then, the microcomputer 547 closes the switch 134 to perform the tracking control. Further, the microcomputer 547 controls the signal processing circuit 500 to select the CD information reproducing circuit 602. Therefore, the signal processing circuit 500 reproduces information recorded in the CD and sends data to the microcomputer 547. In FIGS. 21(*a*) and 21(*b*), waveforms shown by dotted lines appear when the focusing control is not performed, as described for the third embodiment of the invention.

Furthermore, the signal processing circuit 500 will be described in detail with reference to FIGS. 21(*c*) and 21(*d*).

Figure 21:
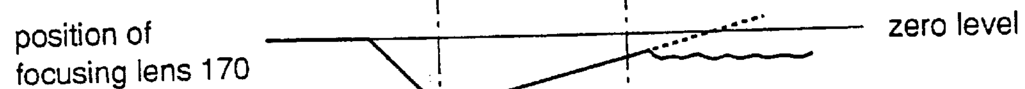
FIGS. 21(*a*) and 21(*b*) are waveforms illustrating a movement of a focusing lens and an FE signal, respectively, and FIGS. 21(*c*) and 21(*d*) are block diagrams illustrating a signal processing circuit and a CD information reproducing circuit, respectively, according to the fifth embodiment of the invention.
Figure 21:
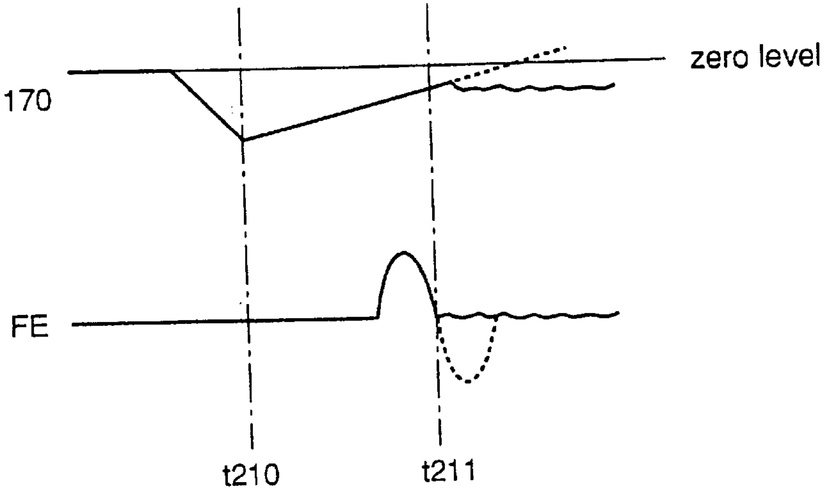
Figure 21:
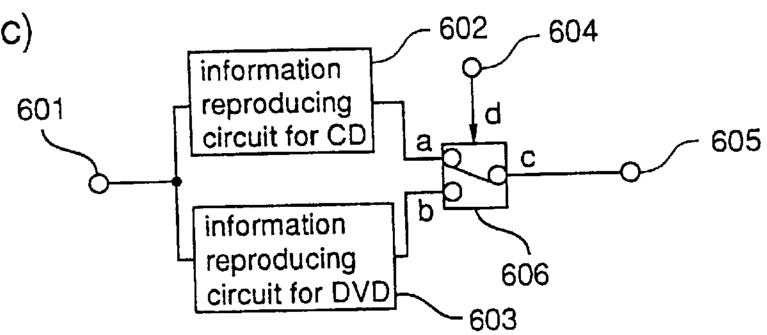
Figure 21:
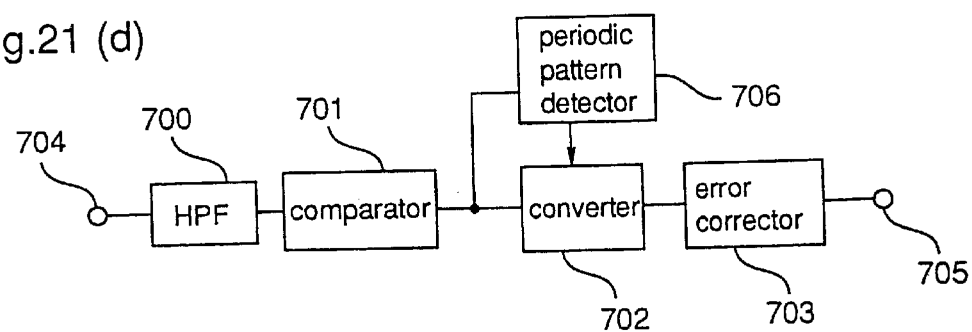

FIG. 21(*c*) is a block diagram showing the signal processing circuit 500. In FIG. 21(*c*), a first input terminal 601 is connected to the adder 148 and receives the AS1 signal. An output terminal 605 is connected to the microcomputer 547. A CD information reproducing circuit 602 is a circuit for reproducing information recorded in a CD.

A DVD information reproducing circuit 603 is a circuit for reproducing information recorded in a DVD. A switch 606 selects a signal at terminal a or a signal at terminal b according to a level of control terminal d and sends the signal to terminal C. A second input terminal 604 is connected to the control terminal d of the switch 606.

FIG. 21(*d*) is a block diagram illustrating the CD information reproducing circuit 602. An input terminal 704 receives the AS1 signal. An output terminal 705 is connected to the switch 606. A high-pass filter 700 eliminates a low frequency component. A comparator 701 outputs a high level signal when the level of an input signal is higher than zero, and outputs a low level signal when the level of the input signal is lower than zero. A periodic pattern detector 706 detects a periodic pattern at the top of a frame in a signal format of the CD. A converter 702 converts 17-bit input data to 8-bit data. A reference timing for dividing input data to 17-bit data is based on an output signal from the periodic pattern detector 706. This convresion is performed according to a conversion table based on EFM (eight-to-fourteen modulation) that is a CD system modulation process. In the EFM, 14-bit data within 17-bit data have information, and the 14-bit data can take only 256 kinds of values. Therefore, the conversion table converts 256 kinds of input data to 8-bit data corresponding to the input data. An output signal from the converter 702 is sent to an error corrector 703 wherein errors in the CD system are corrected.

Since the focal point $F_{CD}$ is now on the information face of the CD, data corresponding to one of the 256 kinds of data on the conversion table are input to the converter 702. Therefore, the input data are correctly converted, whereby information recorded in the disk 100 is reproduced.

A description is given of the operation when the disk 100 is a DVD. Although the disk 100 is a DVD, the timing for performing the focusing control is the timing when the focal point $F_{CD}$ is on the information face of the disk. Therefore, the focusing control is performed so that the focal point $F_{CD}$ is on the information face of the disk. The microcomputer 547 closes the switch 134 to perform the tracking control. Further, the microcomputer 547 controls the signal processing circuit 500 to select the CD information reproducing circuit 602.

However, since the CD system modulation process is different from a modulation-process for the DVD, the data input to the converter 702 in the signal processing circuit 500 are different from the 256 kinds of data on the conversion table. So, the converter 702 does not output data and, therefore, the error corrector 703 is not operated. In this case, no information is sent to the microcomputer 547.

When the microcomputer 547 knows that no information is sent from the signal processing circuit 500, it identifies the disk 100 as a DVD. Then, the microcomputer 547 opens the switches 131 and 134 to immobilize the focusing control system and the tracking control system. The subsequent processing will be described using waveforms shown in FIGS. 22(*a*) and 22(*b*). The waveform in FIG. 22(*a*) shows the position of the focusing lens 170, and the waveform in FIG. 22(*b*) shows the FE signal as an output signal from the differential amplifier 117.

Figure 22:
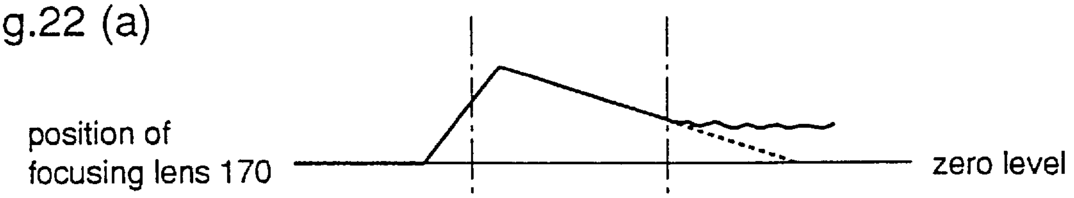
FIGS. 22(*a*) and 22(*b*) are waveforms illustrating a movement of a focusing lens and an FE signal, respectively, according to the fifth embodiment of the invention.
Figure 22:
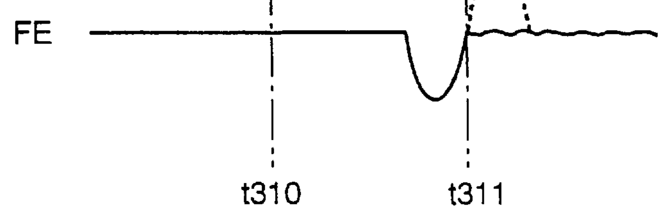

The microcomputer 547 sets the rotating speed of the motor 101 at a rotating speed of an inner circumference of a DVD. The microcomputer 547 sets a value in the D/A converter 141 to move the focusing lens 170 once toward the disk 100 (t310 in FIG. 22(*a*)). Thereafter, the microcomputer 547 moves the focusing lens 170 gradually downward and closes the switch 131 at the timing when the FE signal crosses the zero level for the first time, thereby performing the focusing control. This timing is denoted by t311 in FIG. 22(*b*). As already described for the third embodiment of the invention, when the disk 100 is a DVD, this timing for performing the focusing control is the timing when the focal point $F_{DVD}$ is on the information face of the disk. Thereafter, the microcomputer 547 closes the switch 134 to perform the tracking control. Further, the microcomputer 547 controls the signal processing circuit 500 to select the DVD information reproducing circuit 603. Therefore, the signal processing circuit 500 reproduces information recorded in the disk 100 and sends data to the microcomputer 547. In FIGS. 22(*a*) and 22(*b*), waveforms shown by dotted lines appear when the focusing control is not performed, as described for the third embodiment of the invention.

In this fifth embodiment of the invention, the microcomputer 547 starts the operation on the assumption that the disk 100 is a CD, it may starts the operation on the assumption that the disk 100 is a DVD. In this case, the rotating speed of the motor 101 is set at a rotating speed of an inner circumference of a DVD. The focusing lens 170 is moved once upward and then gradually downward, and the focusing control is performed at the first zero cross timing of the FE signal, and the tracking control is performed. The DVD information reproducing circuit 603 is selected in the signal processing circuit 500. When no information is reproduced, the disk 100 is identified as a CD, and the focusing control system and the tracking control system are immobilized. Then, the rotating speed of the motor 101 is set at a rotating speed of an inner circumference of a CD. The focusing lens 170 is moved once downward and then gradually upward, and the focusing control is performed at the timing when the ENV signal exceeds a prescribed level and the FE signal crosses the zero level for the first time, and the tracking control is performed. In the signal processing circuit 500, the CD information reproducing circuit 602 is selected.

As described above, according to the fifth embodiment of the invention, in an optical disk apparatus using an optical head having two focal points, i.e., a focal point for reproducing a disk having a thick base substrate and a focal point for reproducing a disk having a thin base substrate, even when the focusing control is performed using an inappropriate focal point, the signal processing circuit 500 detects that the focusing control is performed with the inappropriate focal point. Therefore, it is possible to try the focusing control again with an appropriate focal point.

What is claimed is:

1. An optical disk apparatus for reproducing information recorded on an information face of a disk set in said optical disk apparatus by irradiating the information face with a laser beam, said optical disk apparatus comprising:

focal point moving means for moving a focal point of the laser beam, for reproducing the information, in a direction perpendicular to the information face;

reflected light detecting means for detecting a reflected light from the disk; and discriminating means for discriminating whether the disk set in said optical disk apparatus is a disk having a thick substrate or a disk having a thin substrate;

wherein a maximum value $AS1L_{max}$ of an output signal from said reflected light detecting means and a maximum value $ENV_{max}$ of an amplitude of an information reproducing signal are detected while said focal point moving means is driven so that the focal point passes through the information face; and wherein said discriminating means discriminates whether the disk set in said optical disk apparatus is the disk having a thick substrate or the disk having a thin substrate on the basis of a ratio of $ENV_{max}$ and $ASIL_{max}$.

2. An optical disk apparatus for reproducing information recorded on an information face of a disk set in said optical disk apparatus by irradiating the information face with a laser beam, said optical disk apparatus comprising:

focal point moving means for moving a focal point of the laser beam, for reproducing the information, in a direction perpendicular to the information face;

reflected light detecting means for detecting a reflected light from the disk; and discriminating means for discriminating whether the disk is set in said optical disk apparatus is a disk having one information face or a disk having two information faces;

wherein said discriminating means discriminates the disk set in said optical disk apparatus as the disk having one information face when said focal point moving means is driven so that the focal point passes through the information face and a single maximum value of an amplitude of an information reproducing signal output from said reflected light detecting means is greater than a single prescribed level, and discriminates the disk set in said optical disk apparatus as the disk having two information faces when the single maximum value of the amplitude of the information reproducing signal output from said reflected light detecting means is lower than the single prescribed level.

3. The apparatus of claim 2, further comprising:

a focus error signal detector detecting a focus error signal that shows a focused state of the laser beam irradiating the information face of the disk on a basis of an output signal from said reflected light detecting means;

wherein said discriminating means discriminates the disk set in said optical disk apparatus as the disk having two information faces when an amplitude of the focus error signal is lower than a prescribed level.

4. The apparatus of claim 1, wherein the information recorded in the disk is reproduced using an optical system for a disk having a thin substrate.

5. The apparatus of claim 1, wherein a moving speed of the focal point is reduced by controlling said focal point moving means when the output signal from said reflected light detecting means exceeds a prescribed level.

6. The apparatus of claim 2, wherein a moving speed of the focal point is reduced by controlling said focal point moving means when the output signal from said reflected light detecting means exceeds a prescribed level.

* * * * *